APPARATUS FOR CORRECTING ERROR-BURSTS IN BINARY CODE

Filed Dec. 14, 1962

11 Sheets-Sheet 1

INVENTOR
ROBERT T. CHIEN
BY Bernard N. Wiener
ATTORNEY

APPARATUS FOR CORRECTING ERROR-BURSTS IN BINARY CODE

Filed Dec. 14, 1962

11 Sheets-Sheet 3

APPARATUS FOR CORRECTING ERROR-BURSTS IN BINARY CODE

APPARATUS FOR CORRECTING ERROR-BURSTS IN BINARY CODE

Filed Dec. 14, 1962 11 Sheets-Sheet 10

Oct. 11, 1966 R. T. CHIEN 3,278,729

APPARATUS FOR CORRECTING ERROR-BURSTS IN BINARY CODE

Filed Dec. 14, 1962 11 Sheets-Sheet 11

United States Patent Office 3,278,729

Patented Oct. 11, 1966

3,278,729

APPARATUS FOR CORRECTING ERROR-BURSTS IN BINARY CODE

Robert T. Chien, Yorktown Heights, N.Y., assignor to International Business Machines Corporation, New York, N.Y., a corporation of New York Filed Dec. 14, 1962, Ser. No. 244,702
31 Claims. (Cl. 235—153)

This invention relates generally to apparatus for correcting errors in a binary code, and it relates particularly to apparatus for correcting error-bursts in a binary code.

A binary code is utilized to transmit information on a noisy channel. It comprises a sequence of code bits established from a sequence of information bits and a sequence of check bits. If certain binary bits in the code are altered due to the presence of correctable errors during the transmission of the code on the noisy channel, the check bits permit reconstruction of the original sequence of information bits. An error results in the change of a binary bit to its inverse during the transmission, i.e., either a 0 to a 1 or a 1 to a 0.

During the transmission of binary information on a communication channel, the corruption of the binary information by noise results in errors. In the case of a binary channel, a 1 is changed to a 0 or a 0 is changed to a 1. Noise characteristics are such that some error patterns occur more often than others. To improve the accuracy of transmission of the information, the information bits are encoded into a code having redundancy in such a way that when the more probable error patterns occur, the redundancy in the code permits reconstruction of the original information. Such error patterns are termed correctable. An uncorrectable error pattern is an error pattern for which the redundancy in the code does not permit reconstruction of the original information.

An error-burst involves a plurality of errors with the particular number of bits in the code from the first error to the last error defining the burst length $b$. It is often desirable that $t$ independent error-bursts of maximum burst length $b$ in a binary code be corrected, e.g., in connection with magnetic tape storage systems.

Heretofore, the circuitry required for correcting $t$ error-bursts of maximum burst length $b$ in a transmitted binary code has been relatively complex because the code had to be handled as a unit regardless of the number of binary bits therein. Further, units incorporated in the circuitry for effecting a polynomial combination of two polynomials in modulo 2 algebra over a finite field in either the divide or the multiply operation have themselves been unduly complex for easy implementation.

It is the primary object of this invention to provide apparatus for correcting errors in a binary code.

It is a second object of this invention to provide apparatus for correcting $t$ error-bursts of maximum burst length $b$ in a binary code.

It is a third object of this invention to provide apparatus for correcting $t$ independent error-bursts of maximum burst length $b$ in a binary code formed from $b$ particular binary codes.

It is a fourth object of this invention to provide apparatus for correcting $t$ independent error-burst of maximum burst length $b$ in a binary code formed by interlacing $b$ particular binary codes.

It is a fifth object of this invention to provide apparatus for correcting $t$ independent error-bursts of maximum burst length $b$ in a binary code formed by interlacing $b$ particular binary codes sequentially bit by bit.

It is a sixth object of this invention to provide apparatus for correcting errors in binary code which includes a feature for effecting a multiplicative polynomial combination of three polynomials in modulo 2 algebra over a finite field.

It is a seventh object of this invention to provide apparatus for correcting errors in binary code which includes a feature for effecting a multiplicative polynomial combination of two polynomials in modulo 2 algebra over a finite field.

It is an eighth object of this invention to provide apparatus for correcting $t$ independent error-bursts of maximum burst length $b$ which includes a feature for dividing one polynomial by another polynomial in modulo 2 algebra over a finite field.

It is a ninth object of this invention to provide apparatus for correcting $t$ independent error-bursts of maximum burst length $b$ which includes a feature for multiplying one polynomial by another polynomial in modulo 2 algebra over a finite field.

It is a tenth object of this invention to provide a unit for effecting a multiplicative polynomial combination of three polynomials in modulo 2 algebra over a finite field.

It is an eleventh object of this invention to provide a unit for effecting a multiplicative polynominal combination of two polynomials in modulo 2 algebra over a finite field.

It is a twelfth object of this invention to provide a unit for dividing one polynomial by another polynomial in modulo 2 algebra over a finite field.

It is a thirteenth object of this invention to provide apparatus for multiplying one polynomial by another polynomial in modulo 2 algebra over a finite field.

It is a fourteenth object of this invention to provide apparatus for decoding an interlaced Bose-Chaudhuri code formed from $b$ Bose-Chaudhuri codes by interlacing them sequentially bit by bit which includes a feature for effecting a multiplicative polynomial combination of three polynomials in modulo 2 algebra over a finite field, thereby correcting $t$ independent error-bursts of maximum burst length $b$ sustained by said interlaced code during its transmission on a noisy channel.

It is a fifteenth object of this invention to provide apparatus for decoding an interlaced Bose-Chaudhuri code formed from $b$ Bose-Chaudhuri codes by interlacing them sequentially bit by bit which includes a feature for effecting a multiplicative polynomial combination of two polynomials in modulo 2 algebra over a finite field, thereby correcting $t$ independent error-bursts of maximum burst length $b$ sustained by said interlaced code during its transmission on a noisy channel.

An advantage of this invention involves the limited complexity of the circuitry required to correct $t$ error-bursts of maximum burst length $b$ in a transmitted binary code. Other advantages of this invention involve the feature thereof for effecting a multiplicative polynomial combination of three polynomials in modulo 2 algebra over a finite field. In particular, this feature permits the divide and multiply operations of one polynomial by another polynomial to be carried out readily with units of limited complexity.

Generally, the invention provides apparatus for correcting $t$ independent error-bursts of maximum burst length $b$ which occur in an interlaced Bose-Chaudhuri code during its transmission on a noisy channel. The invention includes a portion for effecting a multiplicative polynomial combination of three polynomials in modulo 2 algebra over a finite field. A polynomial, according to this terminology, is representative of an element of the finite field.

If the polynominals are characterized as $P_1(X)$, $P_2(X)$ and $P_3(X)$, an illustrative multiplicative polynomial combination is $$(P_1(X) \times P_3(X))/P_2(X)$$

If $P_2(X)$ is the unit polynomial $U(X)$, the combination reduces to the multiply operation $P_1(X) \times P_3(X)$. If $P_3(X)=U(X)$, the combination reduces to the division operation $$P_1(X)/P_2(X)$$

Particularly, apparatus in accordance with the invention includes an encoder which encodes an information stream of binary bits into *b* Bose-Chaudhuri codes. In the encoder, *b* binary bit sequences of the information stream are multiplied by the representative binary bit sequence of a particular generator polynomial $G(X)$ to establish *b* Bose-Chaudhuri codes, each capable of correcting *t* independent errors. Each code is established in a respective shift register. The codes are interlaced sequentially bit by bit to establish an interlaced Bose-Chaudhuri code for transmission on a noisy channel. The interlaced code is capable of correcting *t* error-bursts of maximum burst length *b*. The transmitted interlaced code is de-interlaced at the receiver and the original *b* Bose-Chaudhuri codes are reconstructed and stored in respective shift registers. If the interlaced code sustains *t* error-bursts during transmission of burst length *b*, each reconstructed code has *t* errors. Each reconstructed code is analyzed for errors and up to *t* errors per code are corrected in a section of the apparatus which includes a portion for effecting a polynomial combination of two polynomials in modulo 2 algebra over a finite field. Thereafter, each reconstructed code is decoded by dividing it by the representative binary bit sequence of the generator polynomial $G(X)$ used for the encoding of the respective binary bit sequence of the information stream. If there is a remainder from the division operation, an uncorrectable error was sustained by the interlaced code during transmission on the noisy channel.

The portion of the invention for effecting a multiplicative polynomial combination of three polynomials in modulo 2 algebra over a finite field, e.g., polynomials $P_1(X)$, $P_2(X)$ and $P_3(X)$, includes first and second shift registers in which $P_1(X)$ and $P_2(X)$ are established initially. The shift registers are shifted synchronously until $P_3(X)$ appears in shift register two. A multiplicative polynomial combination of $P_1(X)$, $P_2(X)$ and $P_3(X)$, i. e., $$(P_1(X) \times P_3(X))/P_2(X)$$

appears simultaneously in the first shift register.

The portion of the invention for effecting a polynomial combination of two polynomials in modulo 2 algebra over a finite field includes a feature for division of a dividend polynomial by a divisor polynomial and another feature for multiplication of a multiplicand polynomial by a multiplier polynomial. The feature of the invention for dividing one polynomial by another polynomial utilizes two shift registers in which the representative binary bit sequences of the divisor and the dividend are established. The shift registers are shifted synchronously. When the unit polynomial appears in the divisor register, the quotient simultaneously appears in the dividend register.

The feature of the invention for multiplying one polynomial by another polynomial includes two shift registers and a storage register. The representative binary bit sequence of the multiplicand is established in one shift register, the unit polynomial is established in the other shift register, and the representative binary bit sequence of the multiplier is established in the storage register. The shift registers are shifted synchronously until the multiplier appears in the unit polynomial shift register. The representative binary bit sequence for the product appears in the multiplicand shift register simultaneously with the appearance of the multiplier in the unit polynomial shift register.

A Bose-Chaudhuri cyclic code has a length of $2^m-1$ bits. It utilizes *mt* parity check bits to correct *t* independent errors. In accordance with this invention, *b* Bose-Chaudhuri codes, $$C_1(X)=c_{1-(n-)} \cdots c_{1\text{-}2}c_{1\text{-}1}c_{1\text{-}0}$$
$$C_2(X)=c_{2-(n-1)} \cdots c_{2\text{-}2}c_{2\text{-}1}c_{2\text{-}0}$$
$$\text{-------------------------------}$$
$$C_b(X)=c_{b\text{-}(n-1)} \cdots c_{b\text{-}2}c_{b\text{-}1}c_{b\text{-}0}$$

are interlaced to establish an interlaced Bose-Chaudhuri code, which corrects *t* independent error-bursts of maximum burst length *b*, $$(B-C)\ (X)=c_{b-(n-1)} \cdots c_{2-(n-1)}c_{1-(n-1)} \cdots c_{1\text{-}1}\ c_{2\text{-}1} \cdots c_{b\text{-}1} \cdots c_{1\text{-}0}\ c_{2\text{-}0} \cdots c_{b\text{-}0}$$

The statement herein that a code detects or corrects certain errors refers to its mathematical capability therefor and does not imply the hardware required for the practice of error detection or error correction.

The foregoing and other objects, features and advantages of this invention will be apparent from the following more particular description of a preferred embodiment of the invention, as illustrated in the accompanying drawings.

In the drawings:

FIG. 1 illustrates the manner in which FIGS. 1*a* and 1*b* are arranged.

FIGURE 1*a* is a block diagram of the section in which encoding, interlacing and deinterlacing are accomplished.

FIGURE 1*b* is a block diagram of the section in which error correction is accomplished and the original information stream is re-established.

Figures 4A, 11:
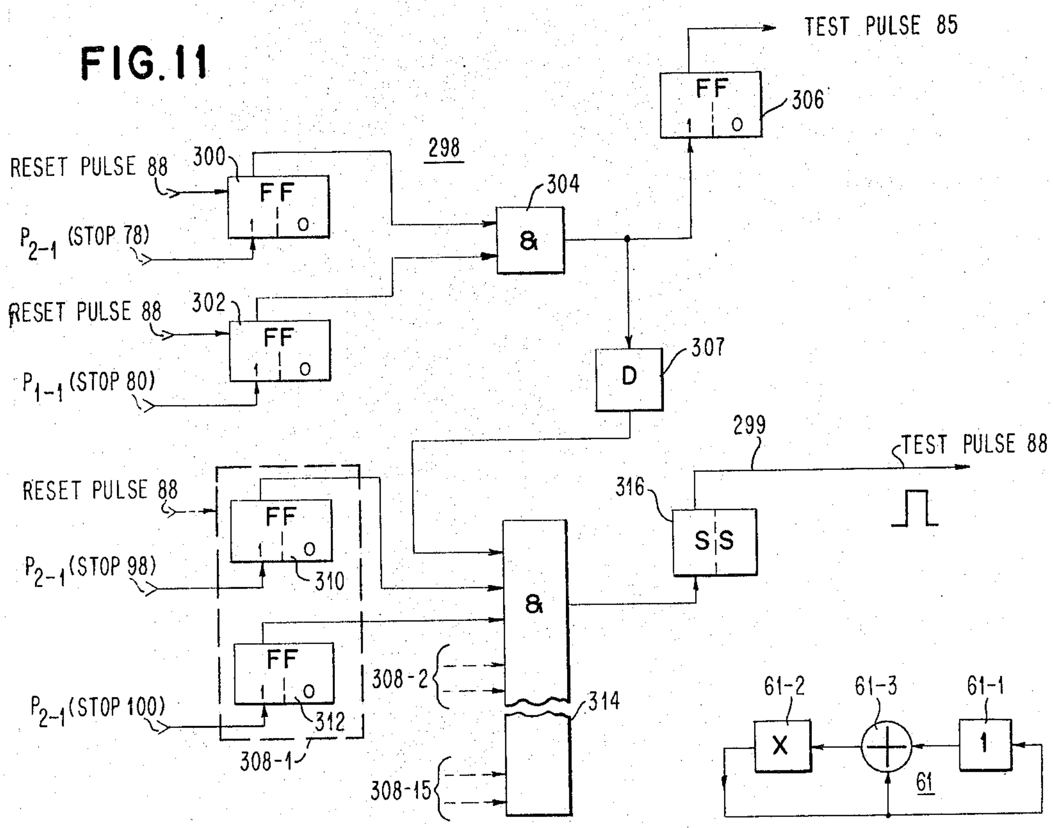

FIGURE 4*a* is a functional block diagram of a linear sequential circuit illustrating the nature of a cyclic group in a finite field.

Figure 4B:
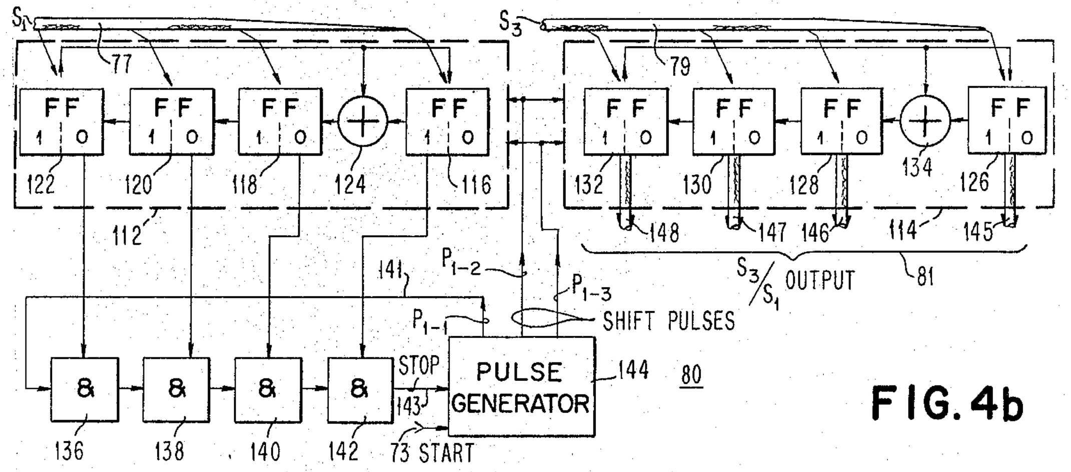

FIGURE 4*b* is a block diagram of a divide unit for performing division of one polynomial by another polynomial in modulo 2 algebra over a finite field.

Figure 5:
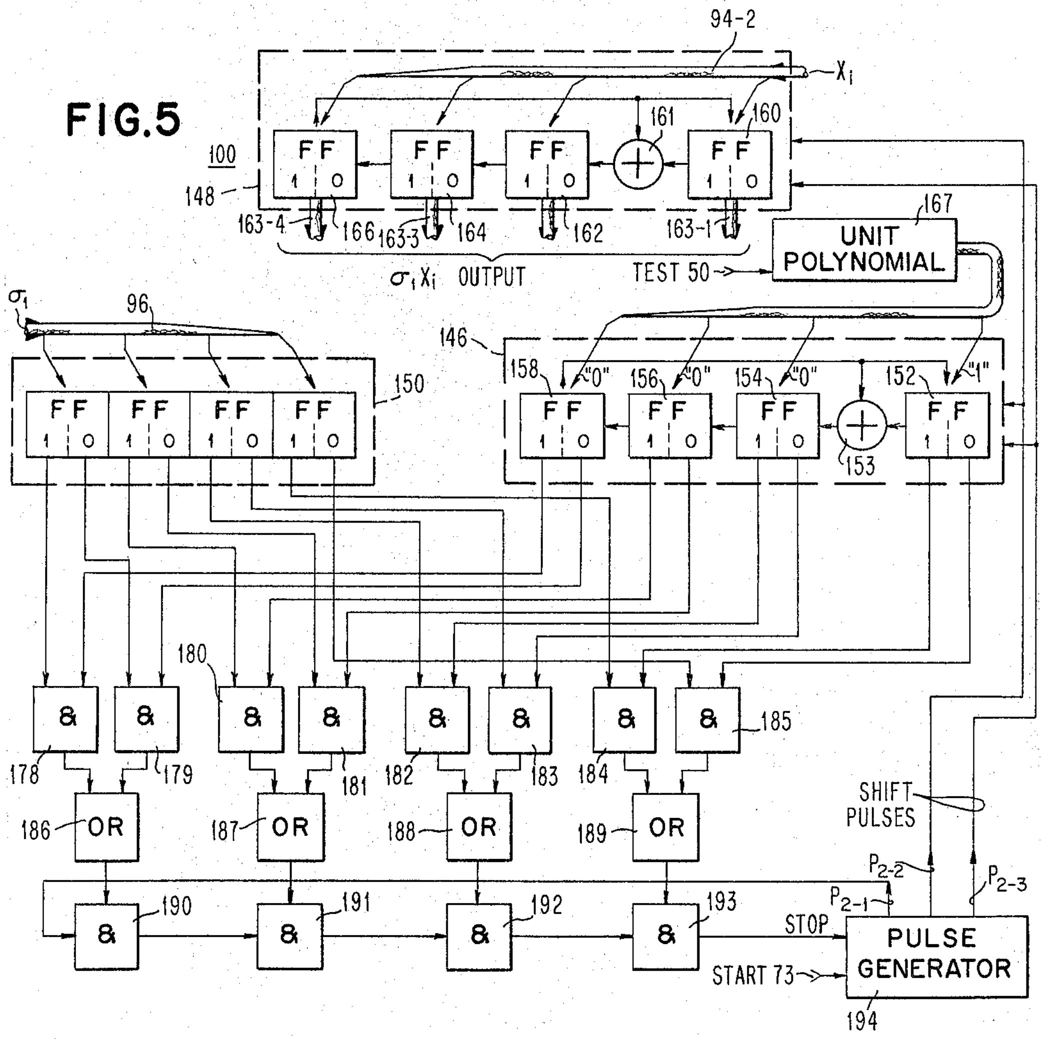

FIGURE 5 is a block diagram of a multiply unit for performing multiplication of one polynomial by another polynomial in modulo 2 algebra over a finite field.

Figure 6:
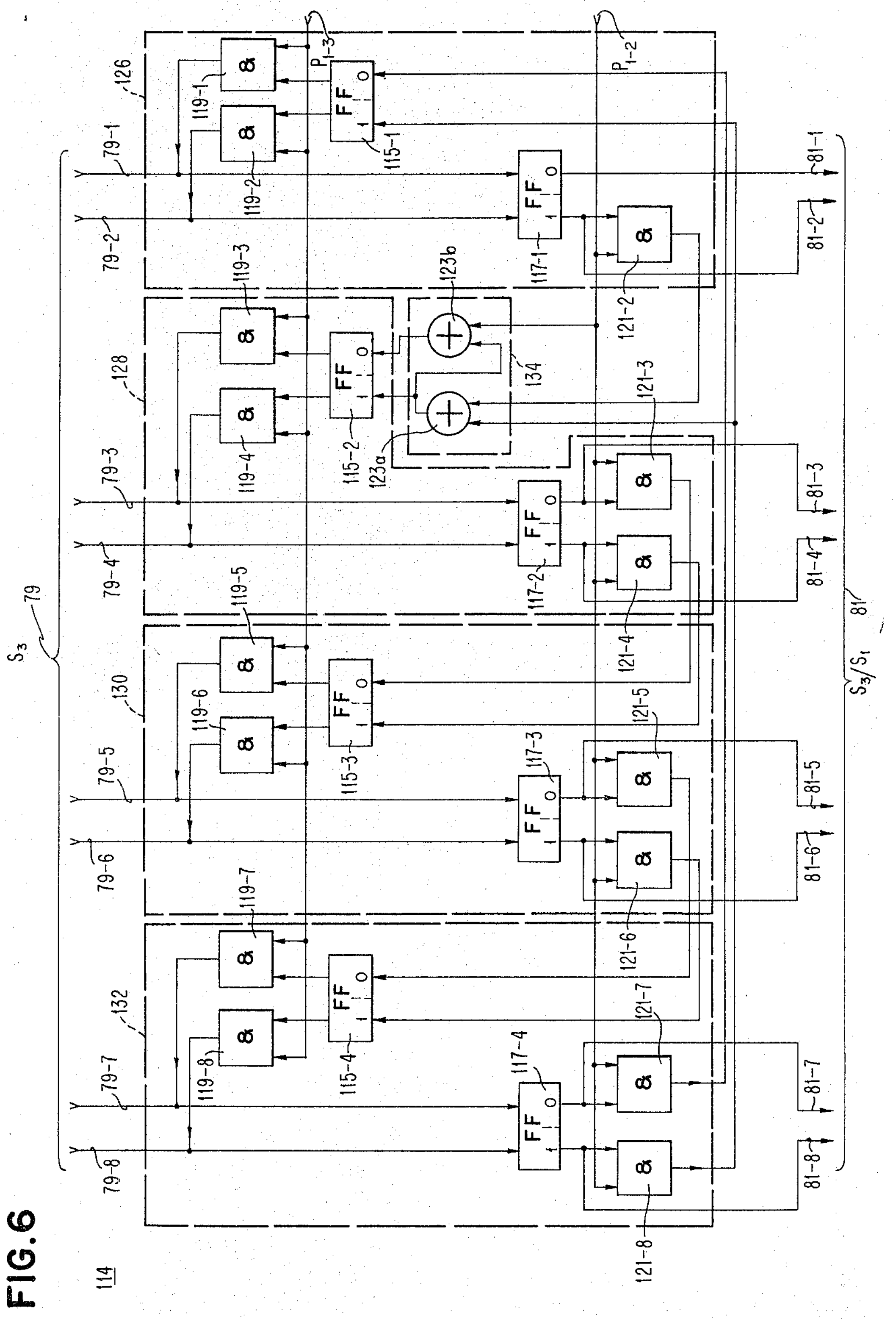

FIGURE 6 is a block diagram of a shift register suitable for incorporation in the divide unit of FIGURE 4*b* and in the multiply unit of FIGURE 5.

Figure 7:
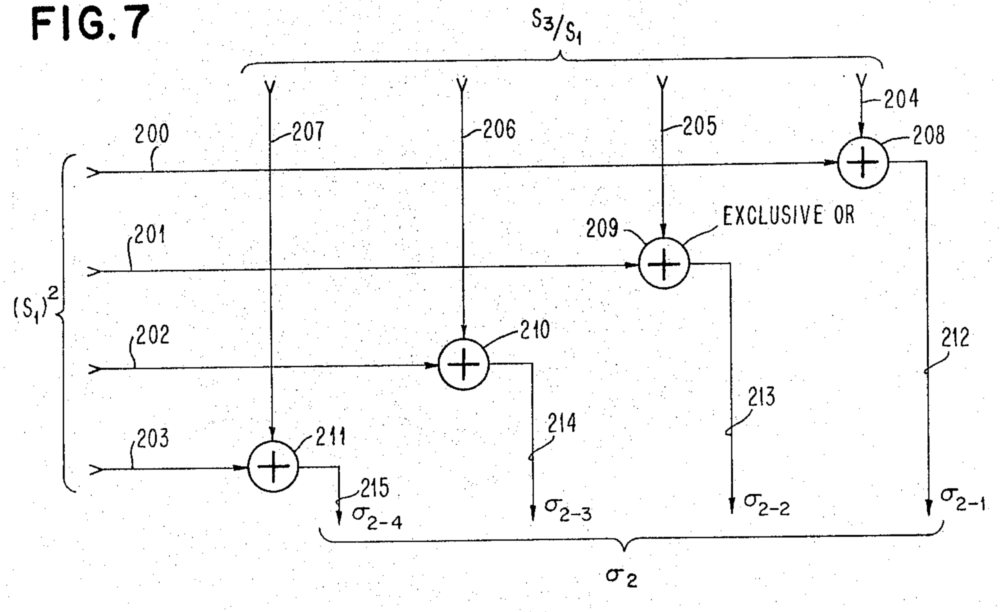

FIGURE 7 is a block diagram of an add unit to provide the sum of two polynomials in modulo 2 algebra over a finite field.

Figure 8:
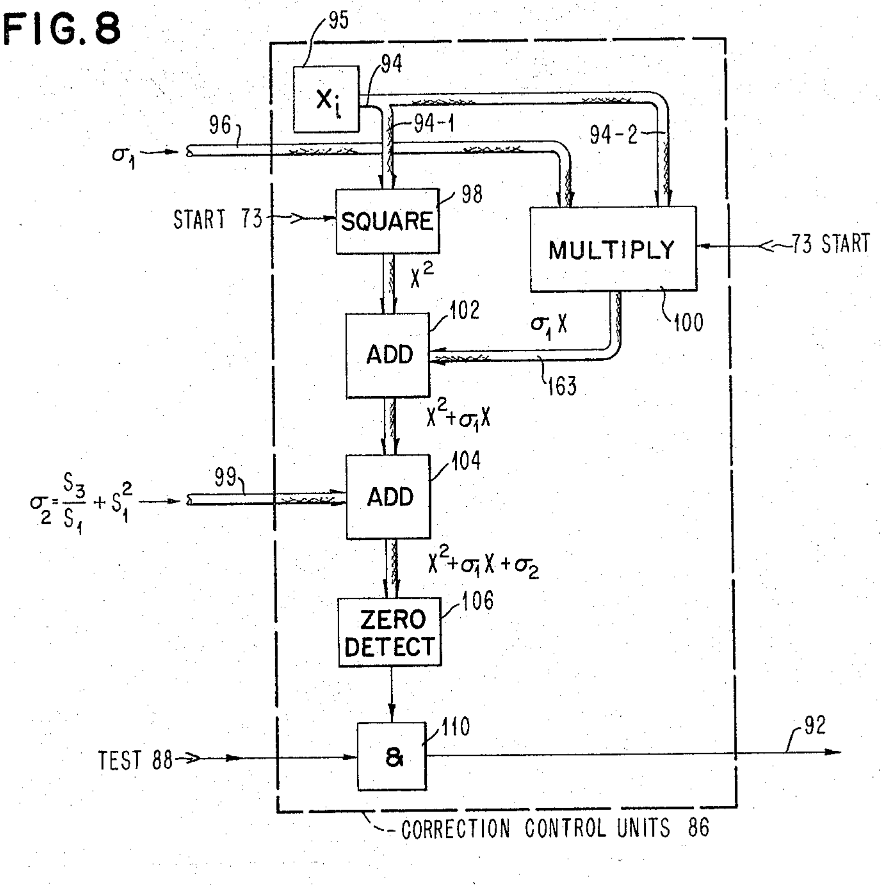

FIGURE 8 is a block diagram of a correction control unit for correcting each error position in a reconstructed Bose-Chaudhuri code after transmission on a noisy channel.

Figure 9:
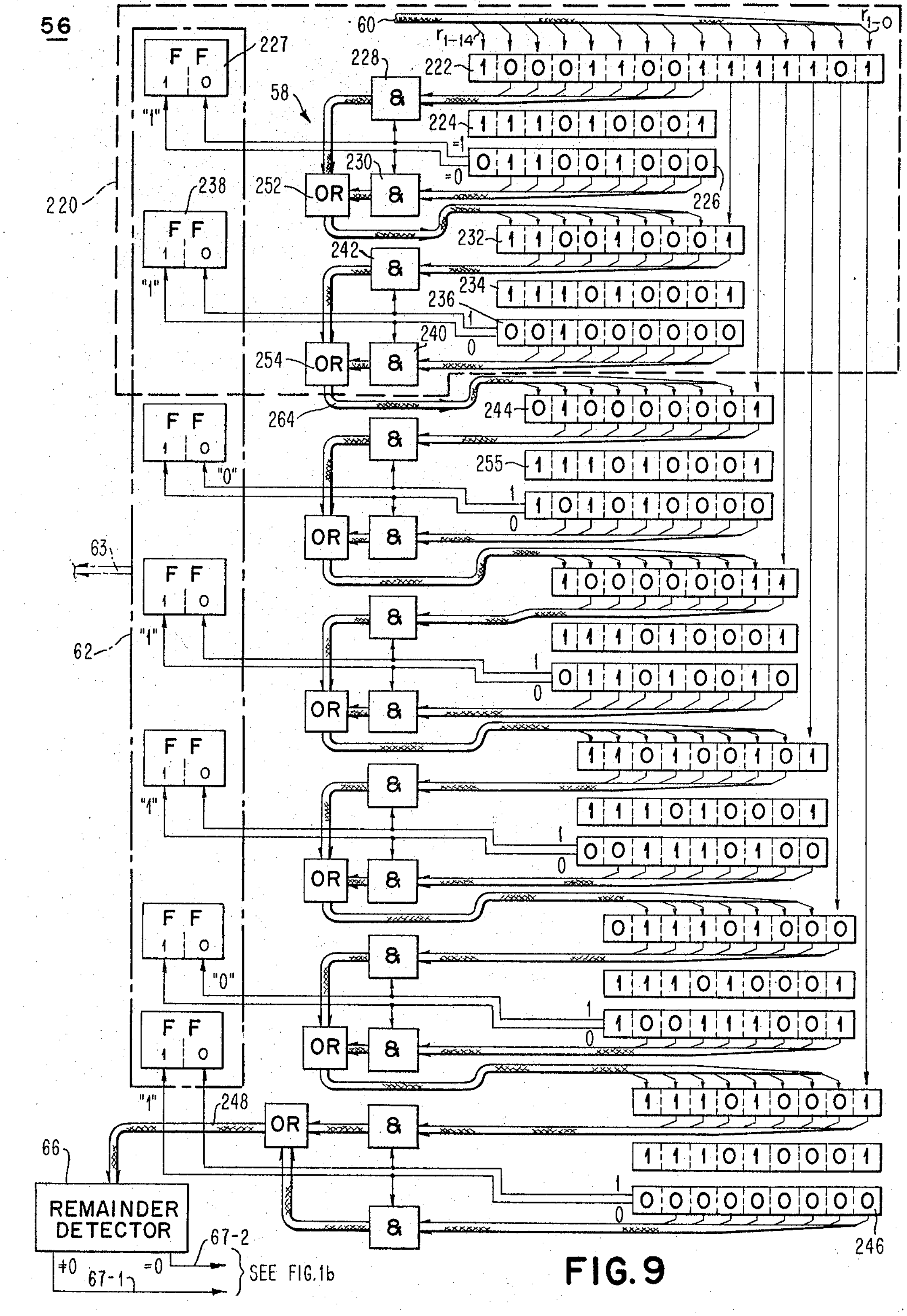

FIGURE 9 is a block diagram of the decoder unit.

Figures 10, 10A:
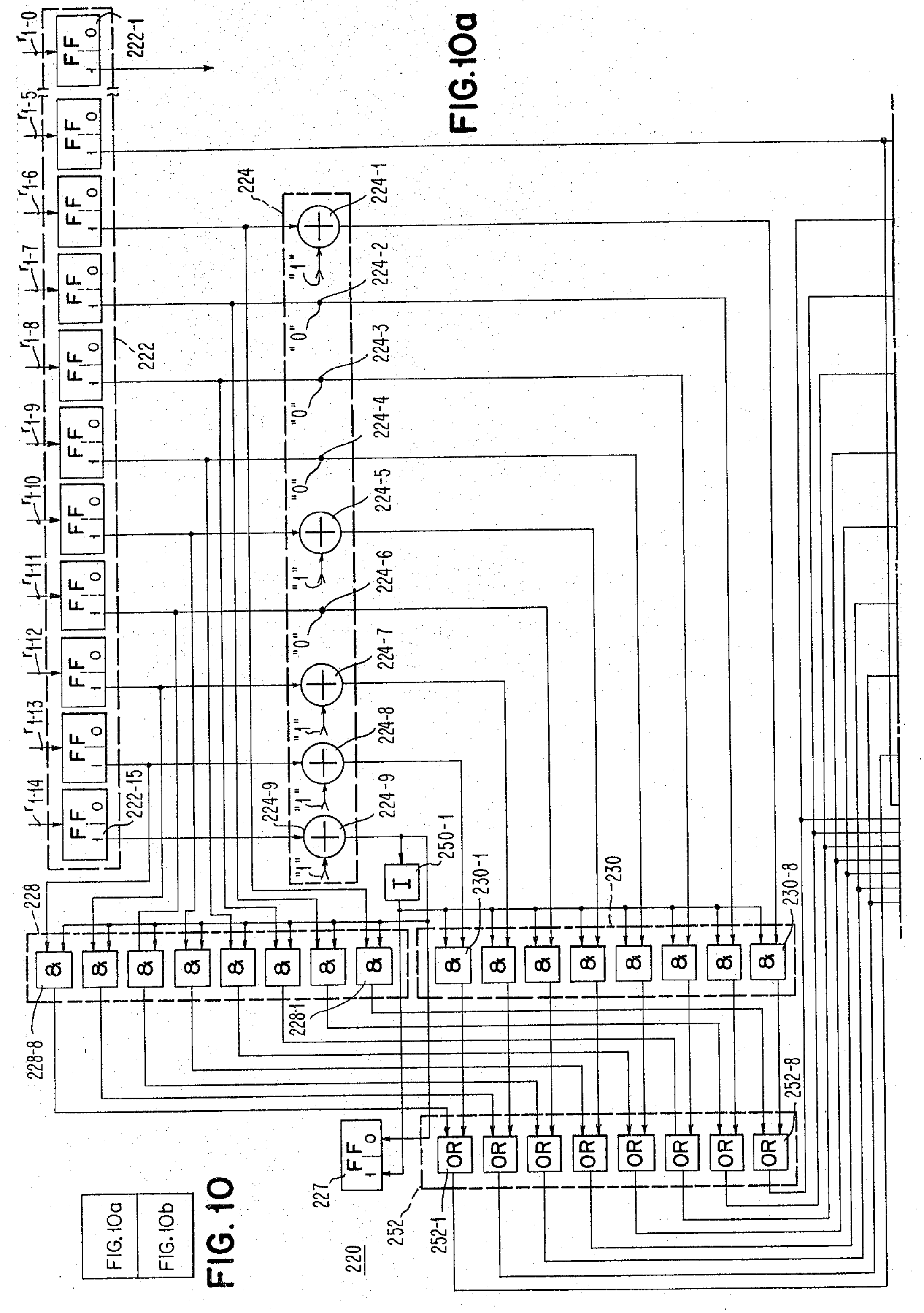
Figure 10B:
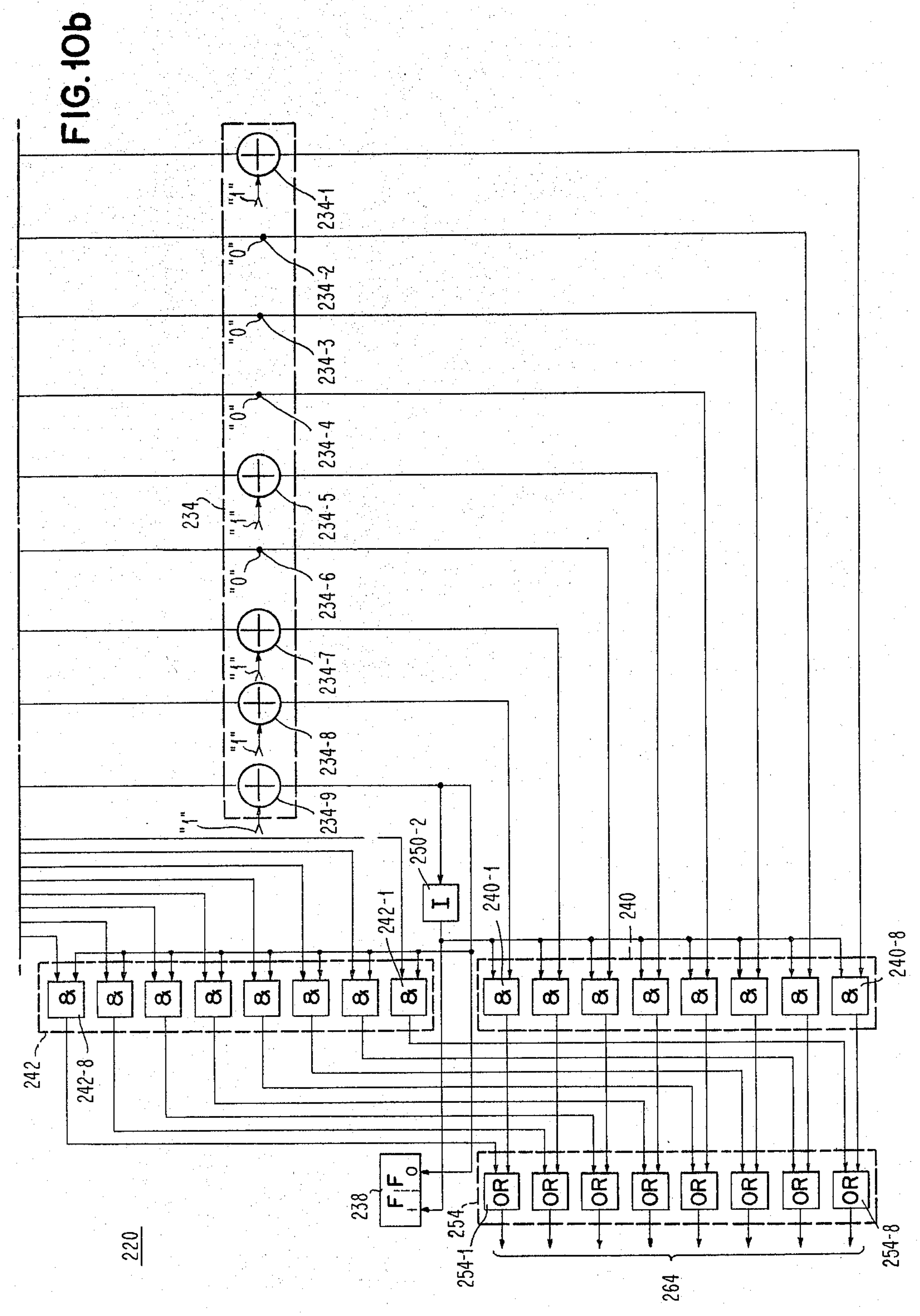

FIG. 10 illustrates the manner in which FIGS. 10*a* and 10*b* are arranged.

FIGURES 10*a* and 10*b* present a portion of the decoder unit of FIGURE 9 in a greater detail.

FIGURE 11 is a block diagram of a circuit for obtaining certain test pulses from certain timing pulses.

Figure 12:
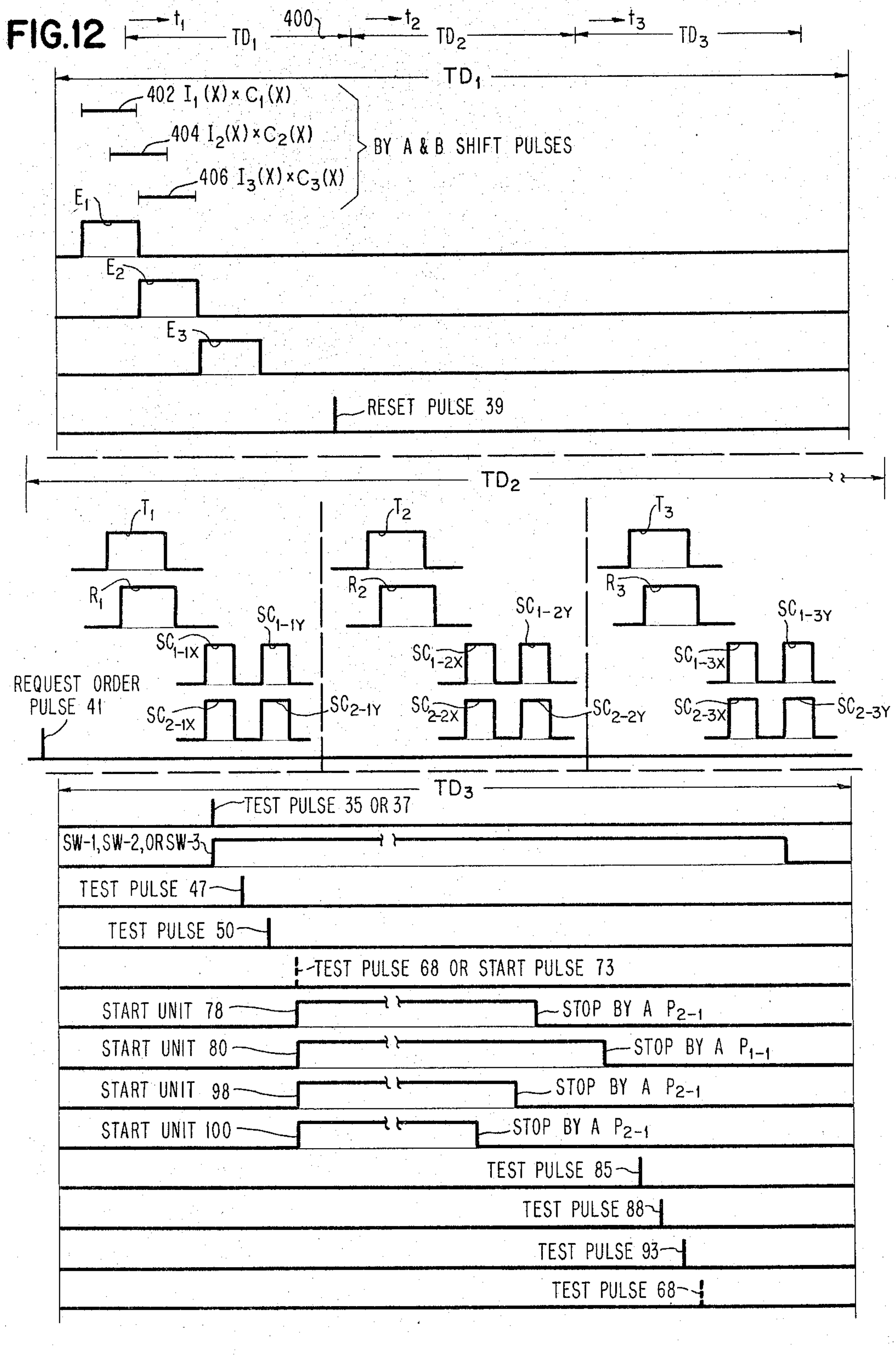

FIGURE 12 is a timing chart showing the time relationships among various timing pulses and test pulses.

A background exposition of the theory of polynomial combinations over a finite field is presented in the book, "Modern Algebra," vol. 1, B. L. van der Waerden, F.

Ungar Publishing Co., New York, New York, 1949. A finite field has well-defined algebraic properties. The fields with which this invention is concerned are finite fields.

Background reports on the theory of cyclic codes for error correction and on the construction of Bose-Chaudhuri codes are:

(a) Article, "Cyclic Codes for Error Detection," W. W. Peterson and D. T. Brown, Proceedings of the IRE, vol. 49, pp. 228–235, January 1961.

(b) Article, "Encoding and Error-Correction Procedures for the Bose-Chaudhuri Codes," W. W. Peterson, IRE Transactions on Information Theory, vol. II–6, pp. 459–470, September 1960.

(c) Book, "Error-Correcting Codes," by W. W. Peterson, John Wiley & Sons, Inc., 1961.

*Theory of cyclic codes for error correction*

The following discussion of the theory of cyclic codes for error correction is in accordance with the noted article by W. W. Peterson and D. T. Brown in the Proceedings of the IRE. It will define the terminology in this regard utilized hereinafter in the description of the nature and operation of the invention.

I. *Polynomial representation of binary information.*—A sequence of $k$ information binary bits is encoded to a code sequence of $n$ binary bits by incorporating therewith a sequence of $n–k$ check binary bits. The binary bits of each sequence are considered to be coefficients of a polynomial in the dummy variable X. Illustratively, the information polynomial is written as $$I(X)=i_kX^k\ .\ .\ .\ i_2X^2+i_1X^1+i_0X^0$$

According to the convention employed herein, the sequence of binary bits of a polynomial is transmitted on a channel from its low-order term to its high-order term, e.g., for I(X) as defined above, $i_0$ enters the channel first and $i_k$ enters the channel last. The polynomials are operated on in modulo 2 algebra over a finite field. The associative, commutative and distributive laws of modulo 2 algebra are identical with these laws of ordinary algebra. However, in contrast to addition in ordinary algebra, addition in modulo 2 algebra obeys the following conditions:

$$1X^n+1X^n=0X^n$$

and $$-1X^n=1X^n$$

II. *Algebraic description of cyclic codes.*—A cyclic code polynomial for transmission on a channel is established from an information polynomial by multiplying it by a generator polynomial written as $$G(X)=g_{n-k}X^{n-k}+.\ .\ .\ g_2X^2+g_1X^1+g_0X^0$$

A code polynomial must be evenly divisible by the generator polynomial G(X) for it to be capable of correcting errors sustained during its transmission on a noisy channel.

III. *Principles of error correction.*—If a code polynomial C(X) sustains errors during the transmission on a noisy channel, the received polynomial may be represented as $$R(X)=C(X)+E(X)$$

where E(X) is an error polynomial which has a non-zero term in each error position and represents the error patten in the transmitted code polynominal. If the received polynomial R(X) is not evenly divisible by the generator polynomial G(X), an error has occurred. Since C(X) was constructed to be evenly divisible by G(X), R(X) is evenly divisible by G(X) if and only if E(X) is also evenly divisible by G(X). Hence, an error pattern is detectable if and only if the error polynomial E(X) is not evenly divisible by G(X). Therefore, the generator polynomial G(X) must be selected so that no error pattern E(X) which is to be detected is evenly divisible by G(X).

To detect errors, the received polynomial R(X) is divided by the generator polynomial G(X). An error is detected if the remainder is non-zero. If the remainder is zero, either no error occurred or the error is undetectable. Therefore, the ability of a code to correct errors is related to its ability to detect errors. While error correction implies concomitant error detection, the converse is not true, i.e., the capability of a code for error detection and error correction may be different. Each different correctable error pattern must give a different remainder after division of E(X) by G(X). Error correction involves the following considerations:

(1) The received polynomial R(X) is divided by the generator polynomial G(X) to obtain the remainder.

(2) The error polynomial E(X) corresponding to the remainder is obtained from a table or by calculation.

(3) The code polynomial C(X) is obtained by subtracting E(X) from R(X).

IV. *Detection of an error-burst.*—An error-burst of length $b$ is defined as any pattern of errors in a code for which the number of binary bits between the first error and last error, including these errors, is $b$. Any cyclic code generated by a generator polynomial of degree $n–k$ detects any error-burst of maximum burst length $n–k$.

*Construction of Bose-Chaudhuri codes and error correction therewith*

The following discussion of the principles of the construction of Bose-Chaudhuri codes and error correction therewith is in accordance with the noted article by W. W. Peterson in the IRE Transaction on Information Theory. It will define the terminology in this regard utilized hereinafter in the description of the nature and operation of the invention.

For any choice of integers $m$ and $t$, there exists a Bose-Chaudhuri cyclic code of length $2^m-1$ which is capable of correcting any combination of $t$ errors and which requires a generator polynomial whose maximum degree is $mt$. A representation of the Galois field with $2^m$ elements can be formed, i.e., $GF(2^m)$, for an irreducible polynomial P(X) of degree $m$ with 1 and 0 as coefficients. The $GF(2^m)$ consists of all polynomials of degree $m–1$ or less. They can be added term by term in modulo 2 algebra. To multiply two polynomials of the field, the product is formed and the answer is reduced modulo 2 and modulo $p$(X) to a polynomial of degree $m–1$ or less, i.e., the equation $p(X)=0$ is used to eliminate terms having a power greater than $m–1$.

Certain of the $GF(2^m)$ polynomials, called primitive elements, have the property that the first $2^m-1$ powers of a polynomial are all the $2^m-1$ non-zero field elements. Every non-zero element of the field is a root of the equation, $X^{2^m-1}=1$. Conversely, every root of the equation is an element of the field, e.g., if $\alpha$ is any element of the field, $\alpha^{-1}=\alpha^{2^m-2}$. The field elements may be considered to be vectors whose components are the coefficients of the $GF(2^m)$ polynomials. The sum of two vectors corresponds to the sum of the corresponding polynomials. The Bose-Chaudhuri codes are described by giving the matrix of parity check rules, $$M=\begin{vmatrix} 1 & 1 & \cdots & 1 \\ \alpha & \alpha^3 & \cdots & \alpha^{2t-1} \\ \alpha^2 & (\alpha^3)^2 & \cdots & (\alpha^{2t-1})^2 \\ \cdot & \cdot & \cdots & \cdot \\ \alpha^{2^m-2} & (\alpha^3)^{2^m-2} & \cdots & )\alpha^{2t-1})^{2^m-2} \end{vmatrix} \quad (1)$$

where $\alpha$ is a primitive element of the field.

M is a $(2^m-1)\times t$ matrix $GF(2^m)$ elements. However, if each field element is considered to be a vector of $m$ binary bits, then M is a $(2^m-1)$ matrix of binary bits. A vector of $2^m-1$ binary bits is considered to be a code polynomial if it satisfies the parity check described by each column, i.e., if the product of the vector with the matrix is zero, the set of all code polynomials is the null space of the matrix M.

Table I is a representation of the 15 non-zero field elements of $GF(2^4)$, where $\alpha$ is a root of the equation $X^4=X+1$, i.e., $\alpha$ is a primitive element of the field.

TABLE I

| | | |
|---|---|---|
| $\alpha^0=$ | $1=$ | (0001) |
| $\alpha^1=$ | $\alpha=$ | (0010) |
| $\alpha^2=$ | $\alpha^2=$ | (0100) |
| $\alpha^3=$ | $\alpha^3=$ | (1000) |
| $\alpha^4=$ | $\alpha+1=$ | (0011) |
| $\alpha^5=$ | $\alpha^2+\alpha=$ | (0110) |
| $\alpha^6=$ | $\alpha^3+\alpha^2=$ | (1100) |
| $\alpha^7=$ | $\alpha+1=$ | (1011) |
| $\alpha^8=$ | $\alpha^2+1=$ | (0101) |
| $\alpha^9=$ | $\alpha^3+\alpha=$ | (1010) |
| $\alpha^{10}=$ | $\alpha^2+\alpha+1=$ | (0111) |
| $\alpha^{11}=$ | $\alpha^3+\alpha^2+\alpha=$ | (1110) |
| $\alpha^{12}=$ | $\alpha^3+\alpha^2+\alpha+1=$ | (1111) |
| $\alpha^{13}$ | $=$ | (1101) |
| $\alpha^{14}=$ | $=$ | (1001) |
| $\alpha^{15}=1=\alpha^0$ | $=$ | |

(2)

The matrix of parity check rules for $t=2$ is as follows:

$$M_{t-2}=\begin{vmatrix} 0001 & 0001 \\ 0010 & 1000 \\ 0100 & 1100 \\ 1000 & 1010 \\ 0011 & 1111 \\ 0110 & 0001 \\ 1100 & 1000 \\ 1011 & 1100 \\ 0101 & 1010 \\ 1010 & 1111 \\ 0111 & 0001 \\ 1110 & 1000 \\ 1111 & 1100 \\ 1101 & 1010 \\ 1001 & 1111 \end{vmatrix} \quad (3)$$

II. *Error correction with Bose-Chaudhuri codes.*—The result of multiplying a given vector $(v_0, v_1, v_2, \ldots v_{n-1})$, where $n=2^m-1$ components, by the matrix M is a vector of $t$ Galois field elements. The first component of the resultant vector is $$V(\alpha)=v_0+v_1\alpha+v_2\alpha^2+\ldots v_{n-1}\alpha^{n-1}$$

where $$V(X)=v_0+v_1X+\ldots+v_{n-1}X^{n-1}$$

is the polynomial which corresponds to the given vector. The other components of the resultant vector are $V(\alpha^3)$, $V(\alpha^5)$, $\ldots$ $V(\alpha^{2t-1})$. For convenience of exposition, a vector and the corresponding polynomial are not distinguished from each other. A vector is a code word if it is in the null space of M, i.e., if the parity checks $V(\alpha)$, $V(\alpha^3)$, $V(\alpha^5)$, $\ldots$ $V(\alpha^{2t-1})$ are zero. Equivalently, a polynomial S(X) is a code vector for a $t$-error correcting Bose-Chaudhuri code if and only if $\alpha, \alpha^3, \ldots, \alpha^{2t-1}$ are roots of S(X).

The first step in decoding a Bose-Chaudhuri code is to characterize the information contained in the parity check calculation for a received vector which may contain errors. If $e=(e_0, e_1, \ldots, e_{n-1})$ is the vector of errors, i.e., the errors occur in the positions $p_1, p_2, \ldots p_v$, then $$e=1 \text{ for } p=p_1, p_2, \ldots p_v$$
$$e=0 \text{ otherwise.}$$

There is a one to one correspondence between the elements of the error vector and the elements of $GF(2^m)$ which constitute the first column of the parity check matrix M, expression (2) above. The vector of errors $e$ corresponds to the elements $a^i$ occurring in the $i$-th position in the first column of M. The elements $X_1, X_2, \ldots, X_v$ of $GF(2^m)$ which correspond in this way to $e_{i1}, e_{i2} \ldots e_{iv}$ are termed the error position numbers, i.e., $X_j=a^{ij}$ $(j=1, 2, \ldots v)$. If a received vector $R(\alpha)$ has errors in numbers $X_1, X_2, \ldots, X_v$, then the parity check vector $R(\alpha)\times M$ is of the form $(S_1, S_3, S_5 \ldots S_{2t-1})$ where $$S_i=\sum_{i=1}^{v}X_i^{\,i} \quad (4)$$

The $S_i$ are the power-sum symmetric functions, and the parity checks give the first $t$ odd power-sum symmetric functions. The first $t$ even power-sum symmetric functions can be found by utilizing the fact that in modulo 2 algebra $(a+b)^2=a^2+b^2$, i.e., $$S_1^{\,2}=\left[\sum_{i=1}^{v}X_i\right]^2=\sum_{i=1}^{v}X_i^{\,2}=S_2, \quad (5)$$

and $S_4=S_1^{\,4}$, $S_6=S_3^{\,2}$, etc.

If there are $t$ errors, the error position numbers $X_1, \ldots X_t$ satisfy the following equations:

$$S_j=\sum_{i=1}^{t}X_i^{\,j}j=1, 3, \ldots 2t-1, \quad (6)$$

which is a set of $t$ equations in $t$ unknowns, the $X_i$. The solution reveals the positions of the errors in the received vector $R(\alpha)$. Any direct method for solving the equations is extremely difficult, if not impossible, and trying all combination of $t$ of the $2^m-1$ field elements require excessive computations. However, there is a compromise technique which involves the elementary symmetric functions $\sigma_i$ and the power-sum symmetric functions $S_i$ which are related by Newton's identities:

$$\begin{aligned} &S_1-\sigma_1=0 \\ &S_2-S_1\sigma_1+2\sigma_2=0 \\ &S_3-S_2\sigma_1+S_1\sigma_2-3\sigma_3=0 \\ &S_4-S_3\sigma_1+S_2\sigma_2-S_1\sigma_3+4\sigma_4=0 \\ &S_5-S_4\sigma_1+S_3\sigma_2-S_2\sigma_3+S_1\sigma_4-5\sigma_5=0 \end{aligned} \quad (7)$$

The error position numbers $X_1 \ldots X_t$ must satisfy the equation $$X^t-\sigma_1X^{t-1}+\sigma_2X^{t-2}\ldots\pm\sigma_t =(X-X_1)(X-X_2)\ldots(X-X_t)=0 \quad (8)$$

in order that Newton's identities be solvable for the elementary symmetric functions $\sigma_1$. The Equation (8) can be solved by substituting each of the $n=2^m-1$ field elements therein. For each bit in the received vector $R(\alpha)$, the corresponding $GF(2^m)$ element is substituted in Equation (8). If the Equation (8) is satisfied, the bit is wrong and must be changed. If the equation is not satisfied, the bit is correct.

The procedure for correcting error positions in a Bose-Chaudhuri code, in accordance with the foregoing theory, includes three steps:

(1) The matrix of parity checks M and the even numbered power-sum symmetric functions $S_j$ are calculated.
(2) The elementary symmetric functions $\sigma_i$ are calculated from the power-sum symmetric functions $S_j$.
(3) Each field element is substituted into the equation $$X^t+\sigma_1X^{t-1}+\sigma_2X^{t-2}\ldots+\sigma_t=0 \quad (9)$$

The field elements which satisfy Equation (9) correspond to error positions in the received code.

*Nature and operation of the invention*

INTRODUCTION

Figures 1, 1A:
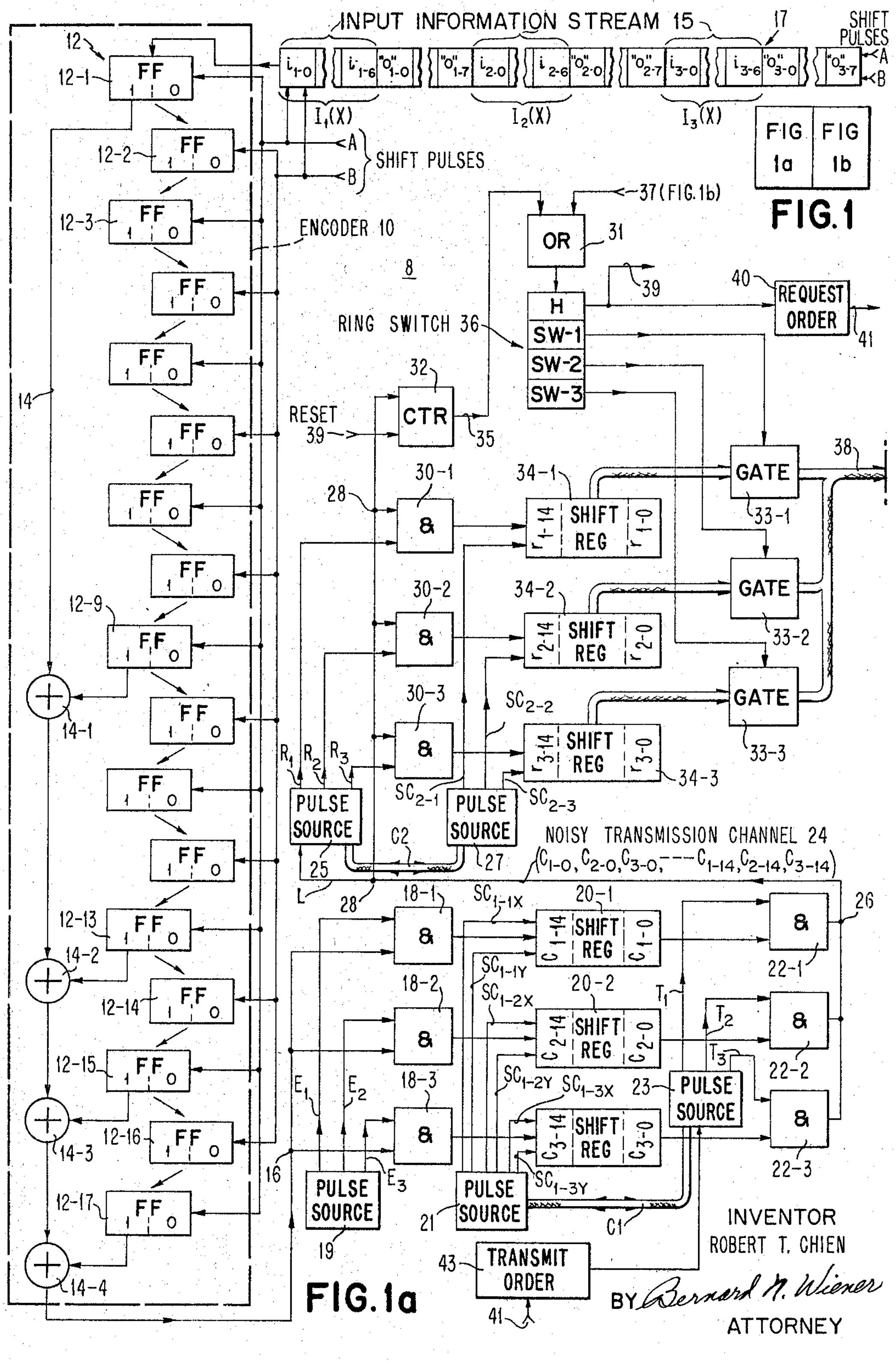

FIG. 1*a* is a block diagram of the section 8 of the embodiment in which the encoding, interlacing and de-interlacing operations are accomplished. An input information stream 15 consisting of three successive sequences with 7 binary bits each is applied to encoder of each storage flip-flop of shift register 12 as consequence of the respective shift pulse.

| FF | $A_1$ | $A_2$ | $A_3$ | $A_4$ | $A_5$ | $A_6$ | $A_7$ | $A_8$ | $A_9$ | $A_{10}$ | $A_{11}$ | $A_{12}$ | $A_{13}$ | $A_{14}$ | $A_{15}$ |
|---|---|---|---|---|---|---|---|---|---|---|---|---|---|---|---|
| 12-1 | 1 | 0 | 1 | 1 | 0 | 1 | 1 | 0 | 0 | 0 | 0 | 0 | 0 | 0 | 0 |
| 12-3 | 0 | 1 | 0 | 1 | 1 | 0 | 1 | 1 | 0 | 0 | 0 | 0 | 0 | 0 | 0 |
| 12-5 | 0 | 0 | 1 | 0 | 1 | 1 | 0 | 1 | 1 | 0 | 0 | 0 | 0 | 0 | 0 |
| 12-7 | 0 | 0 | 0 | 1 | 0 | 1 | 1 | 0 | 1 | 1 | 0 | 0 | 0 | 0 | 0 |
| 12-9 | 0 | 0 | 0 | 0 | 1 | 0 | 1 | 1 | 0 | 1 | 1 | 0 | 0 | 0 | 0 |
| 12-11 | 0 | 0 | 0 | 0 | 0 | 1 | 0 | 1 | 1 | 0 | 1 | 1 | 0 | 0 | 0 |
| 12-13 | 0 | 0 | 0 | 0 | 0 | 0 | 1 | 0 | 1 | 1 | 0 | 1 | 1 | 0 | 0 |
| 12-15 | 0 | 0 | 0 | 0 | 0 | 0 | 0 | 1 | 0 | 1 | 1 | 0 | 1 | 1 | 0 |
| 12-17 | 0 | 0 | 0 | 0 | 0 | 0 | 0 | 0 | 1 | 0 | 1 | 1 | 0 | 1 | 1 |

Since the states of storage flip-flop 12–1, 12–9, 12–13, 12–15 and 12–17 determine the output from encoder 10 on terminal 16, the following tabulation is utilized to indicate the binary bit sequence of the illustrative $C_1(X)$.

| FF | $A_1$ | $A_2$ | $A_3$ | $A_4$ | $A_5$ | $A_6$ | $A_7$ | $A_8$ | $A_9$ | $A_{10}$ | $A_{11}$ | $A_{12}$ | $A_{13}$ | $A_{14}$ | $A_{15}$ |
|---|---|---|---|---|---|---|---|---|---|---|---|---|---|---|---|
| 12-1 | 1 | 0 | 1 | 1 | 0 | 1 | 1 | 0 | 0 | 0 | 0 | 0 | 0 | 0 | 0 |
| 12-9 | 0 | 0 | 0 | 0 | 1 | 0 | 1 | 1 | 0 | 1 | 1 | 0 | 0 | 0 | 0 |
| 12-13 | 0 | 0 | 0 | 0 | 0 | 0 | 1 | 0 | 1 | 1 | 0 | 1 | 1 | 0 | 0 |
| 12-15 | 0 | 0 | 0 | 0 | 0 | 0 | 0 | 1 | 0 | 1 | 1 | 0 | 1 | 1 | 0 |
| 12-17 | 0 | 0 | 0 | 0 | 0 | 0 | 0 | 0 | 1 | 0 | 1 | 1 | 0 | 1 | 1 |
| $C_1(X)=$ | 1 | 0 | 1 | 1 | 1 | 1 | 1 | 0 | 0 | 1 | 1 | 0 | 0 | 0 | 1 (Sum) |
| = | $C_{1-0}C_{1-1} \ldots C_{1-14}$, respectively. | | | | | | | | | | | | | | |

The description herein of the effects of various timing signals will be characterized with reference to the timing diagram of FIG. 12. There is a sequence of time domains in the embodiment. Within each time domain there is a specific relationship among several timing signals. The time interval between successive time domains will be determined by the operational requirements of a particular use of the invention.

As described above, shift pulses A and B transfer binary bits of the information stream 15 from shift register 17 to shift register 12 and cause them to chain there-through and as consequence provide the code bits to terminal 16.

The binary bits of the Bose-Chaudhuri codes $C_1(X)$, $C_2(X)$ and $C_3(X)$ provided to terminal 16 from encoder 10 are established in shift registers 20–1, 20–2 and 20–3, respectively. During the time intervals that the information sequences $I_1(X)$, $I_2(X)$ and $I_3(X)$ are being multiplied by the generator polynomial $G(X)$, AND circuits 18–1, 18–2 and 18–3 are enabled by entry control pulses $E_1$, $E_2$ and $E_3$, respectively, from pulse source 19. Consequently, $C_1(X)$, $C_2(X)$ and $C_3(X)$ are passed via AND circuits 18–1, 18–2 and 18–3 to shift registers 20–1, 20–2 and 20–3, respectively, by pairs of shift pulses $SC_{1-1X}$ and $SC_{1-1Y}$; $SC_{1-2X}$ and $SC_{1-2Y}$. $SC_{1-3X}$ and $SC_{1-3Y}$, respectively.

Each shift register 20 has storage flip-flops and transfer flip-flops. A bit enters a register 20 via a transfer flip-flop and exists via a storage flip-flop. The $SC_1$ shift pulses are timed to establish the C(X)'s in the respective storage flip-flops of the respective shift registers 20. A pair of the shift pulses $SC_{1-1}$, $SC_{1-2}$ and $SC_{1-3}$ occur somewhat later than the respective pair of A and B shift pulses to allow time for encoder 10 to provide each binary bit of a C(X) to terminal 16. The A and B shift pulses, entry control pulses $E_1$, $E_2$ and $E_3$ and the pairs of shift pulses $SC_{1-1}$, $SC_{1-2}$ and $SC_{1-3}$ are timed so that the respective entry control pulse enables the respective AND circuit 18–1, 18–2 and 18–3 while the respective $$C(X)=G(X)\times I(X)$$

is provided by encoder 10 and established in shift registers 20.

The C(X)'s in shift registers 20 are interlaced bit by bit according to their respective bits and introduced to noisy transmission channel 24 as interlaced Bose-Chaudhuri code $$(B—C)(X)=c_{b-(n-1)} \ldots c_{2-(n-1)}c_{1-(n-1)} \ldots c_{1-1}c_{2-1} \ldots c_{b-1} \ldots c_{1-0}c_{2-0} \ldots c_{b-0}$$

The C(X)'s are interlaced by transmit pulses $T_1$, $T_2$ and $T_3$ from pulse source 23, under the direction of transmit-order unit 43. Transmit pulses $T_1$, $T_2$ and $T_2$ enable AND circuits 22–1, 22–2 and 22–3, sequentially. Subsequent to the transmission of a code bit, a pair of appropriate $SC_{1-1}$, $SC_{1-2}$ and $SC_{1-3}$ shift pulses makes the next code bit in the respective shift register 20 available for transmission. Accordingly, the respective pairs of the $SC_1$ shift pulses and the respective transmit pulses $T_1$, $T_2$ and $T_3$ must be appropriately timed to effect the interlacing. The timing between pulse source 23 and pulse source 21 is coordinated via cable $C_1$. Transmit-order unit 43 is stimulated by signal 41 from request-order unit 40. The particular time interval operation of request-order unit 40 and transmit-order unit 41 involve system requirements, they may be either manually or automatically controlled. Their functions are to request an interlaced code and to transmit it, respectively.

The interlaced Bose-Chaudhuri code $(B—C)(X)$ may sustain errors during transmission on noisy channel 24. It is received at terminal 28 and applied via AND circuits 30–1, 30–2 and 30–3, respectively, to shift registers 34–1, 34–2 and 34–3. Shift registers 34 are similar to shift registers 20 and have an entrance transfer flip-flop and an exit storage flip-flop. Receive pulses $R_1$, $R_2$ and $R_3$ from pulse source 25 enable AND circuits 30–1, 30–2 and 30–3 sequentially in aciordance with each sequential bit of the transmitted $(B—C)(X)$ thereby deinterlacing it. Each bit of the respective reconstructed code $$R_2(X)=r_{1-14} \ldots r_{1-1}r_{1-0},$$
$$R_2(X)=r_{2-14} \ldots r_{2-1}r_{2-0}, \text{ and}$$
$$R_3(X)=r_{3-14} \ldots r_{3-1}r_{3-0}$$

is shifted in shift registers 34–1, 34–2 and 34–3, respectively, by pairs of shift pulses $SC_{2-1X}$ and $SC_{2-1Y}$; $SC_{2-2X}$ and $SC_{2-2Y}$; and $SC_{2-3X}$ and $SC_{2-3Y}$, respectively. The binary bits of interlaced code via line L provide the information to phase $R_1$, $R_2$ and $R_3$ with $T_1$, $T_2$ and $T_3$, respectively.

A pair of shift pulses $SC_2$ cause the precedent code bit established in the respective shift register 34 to be moved to the next flip-flop therein. Accordingly, the 10. Encoder 10 operates on each sequence and provides respective 15 bit Bose-Chaudhuri codes which are established in shift registers 20–1, 20–2 and 20–3. The codes are interlaced sequentially bit by bit and transmitted on noisy transimission channel 24 as an interlaced Bose-Chauduri code. The interlaced code with any errors sustained therein during the transmission is de-interlaced and the original Bose-Chauduri codes are reconstructed in shift registers 34–1, 34–2 and 34–3, respectively. Illustratively, if the interlaced code sustained 2 error-bursts of burst length 3, each reconstructed code has 2 error positions therein. Ring-switch 36 under the control of OR circuit 33 causes the reconstructed codes in shift registers 34–1, 34–2 and 34–3 to be established successively in storage registers 42 (FIG. 1*b*) via gate circuits 33–1, 33–2 and 33–3, respectively.

Figure 1B:
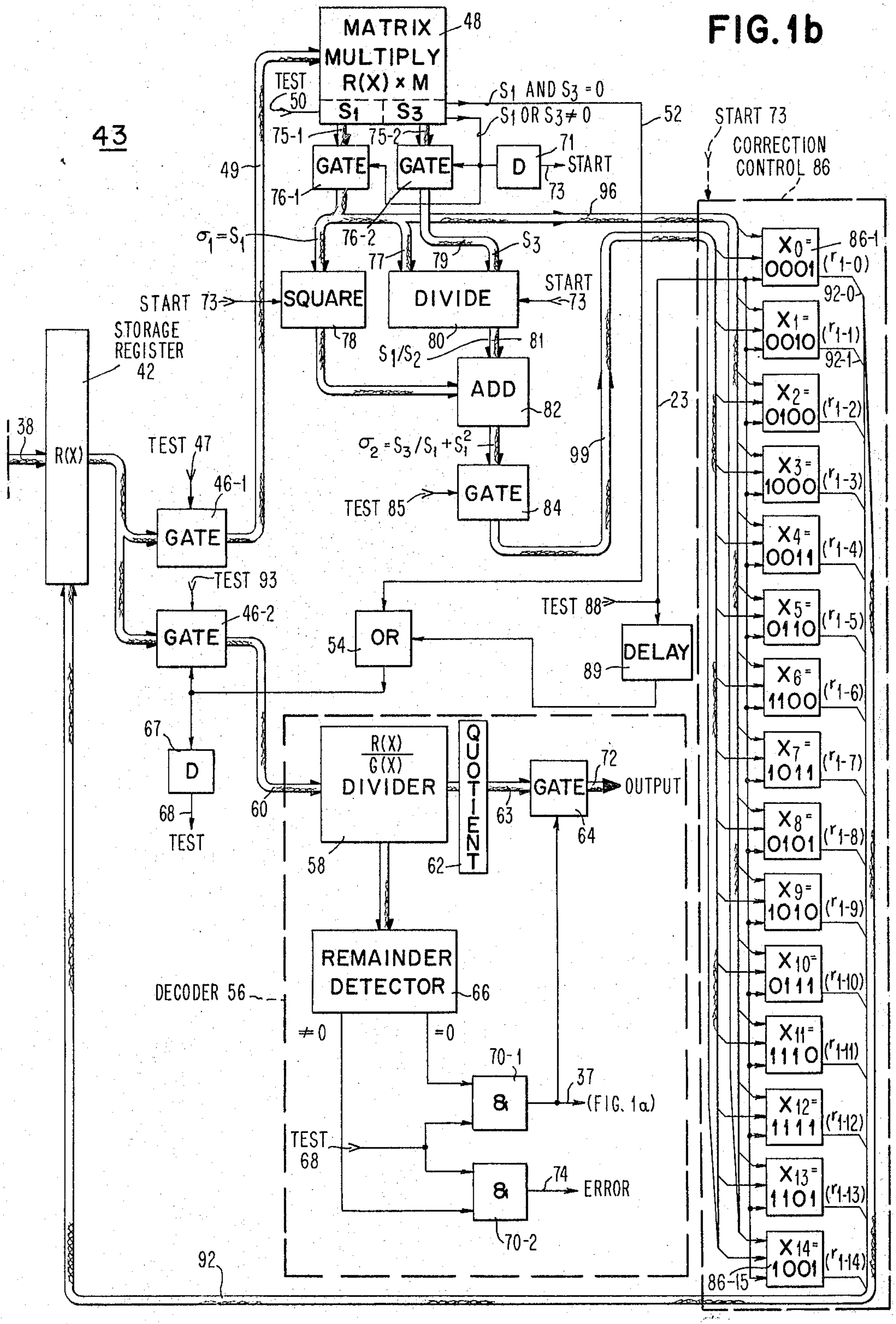

With reference to FIG. 1*b*, a reconstructed code established in storage register 42 is operated on by matrix multiply unit 48 to provide the power-sum symmetric functions $S_1$ and $S_3$. Circuitry between matrix multiply unit 48 and correction control 86 provides the elementary symmetric functions $\sigma_1$ and $\sigma_2$ from $S_1$ and $S_3$. Correction control 86 solves the equation $$X^2+\sigma_1X+\sigma_2=0$$

to provide a signal for correction via cable 92 each correctable error position in the reconstructed Bose-Chaudhuri code established in storage register 42. The corrected code in storage register 42 is passed to divider 58 of decoder 56 which provides a quotient and a reminder. If remainder detector 66 indicates a zero reminder, the quotient in quotient register 62 is applied to output conductor 72 as the original information binary bit sequence from which the respective Bose-Chauduri code was established. A signal on conductor 37 causes ring-switch 36 (FIG. 1*a*) to advance one step and another reconstructed code in shift registers 34–1, 34–2 and 34–3 is thereby established in storage register 42.

FIG. 1*a*

FIG. 1*a* is a block diagram of section 8 of the embodiment in which the encoding, interlacing and de-interlacing operations are performed. It includes an encoder 10 having shift register 12 and inclusive OR path 14.

Exclusive OR path 14 is connected between the binary 1 terminal of flip-flop 12–1 and the input terminal 16 of AND circuits 18–1, 18–2 and 18–3. It comprises exclusive OR circuits 14–1 to 14–4 connected in series. Exclusive OR circuit 14–1 is connected to the binary 1 section of flip-flop 12–9; exclusive OR circuit 14–2 is connected to the binary 1 section of flip-flop 12–13; exclusive OR circuit 14–3 is connected to the binary 1 section of flip-flop 12–15; and exclusive OR circuit 14–4 is connected to the binary 1 section of flip-flop 12–17.

Shift register 12 of encoder 10 comprises flip-flops 12–1 to 12–17 of which the odd numbered flip-flops are for binary bit storage and the even numbered flip-flops are for binary bit transfer between successive storage flip-flops. Each flip-flop has binary 1 and binary 0 input and output terminals. An input information stream 15 having 3 sequences of information binary bits $i_{1-6} \dots i_{1-1}i_{1-0}$
$i_{2-6} \dots i_{2-1}i_{2-0}$ and $i_{3-6} \dots i_{3-1}i_{3-0}$ is established in shift register 17. The three respective representative information polynomials are $$I_1(X)=i_{1-6}X^6+i_{1-5}X^5+ \dots i_{1-0}X^0$$
$$I_2(X)=i_{2-6}X^6+i_{2-5}X^5+ \dots i_{2-0}X^0$$
$$I_3(X)=i_{3-6}X^6+i_{3-5}X^5+ \dots i_{3-0}X^0$$

A polynomial and the corresponding sequence of binary bits will be used interchangeably hereinafter.

Each information sequence in shift register 17 is separated from the successive sequence by 8 binary 0's to allow time for the operation of encoder 10 in establishing the respective Bose-Chaudhuri code. Information stream 15 is introduced to encoder 10 at flip-flop 12–1 of shift register 12. The successive bits of an information sequence are chained through shift register 12 under the timing control of shift pulses A and B. At shift pulse A time an entry is made in each storage flip-flop, and at shift pulse B time an entry is made in each transfer flip-flop. It takes a sequence of 29 shift pulses $A_1B_1A_2 \dots B_{14}A_{15}$ for encoder 10 to provide a corresponding Bose-Chaudhuri code on terminl 16. All flip-flops in shift register 12 are initially set to 0 before an information sequence from information stream 15 is introduced to flip-flop 12–1.

The encoder 10 multiplies each information binary bit sequence $I_1(X)$, $I_2(X)$ and $I_3(X)$ by a generator polynomial $$G(X)=g_8X^8+g_7X^7+ \dots g_0X^0$$

where $$g_8, g_7, g_6, g_4 \text{ and } g_0=1; \text{ and } g_5, g_3, g_2 \text{ and } g_1=0$$

Therefore, G(X) corresponds to the binary bit sequence 111010001, i.e., $$G(X)=X^8+X^7+X^6+X^4+0+0+0+0+1$$

The generator polynomial G(X) is selected in accordance with the teaching of the noted article by W. W. Peterson in the IRE Transactions on Information Theory. It is determined by the parameters *m*, *t*, *k*, and *n* as hereinafter defined. The number of storage flip-flops in shift register 12 is equal to the number of terms in the generator polynomial G(X), where $1=1X^0$ is considered to be a term. Each exclusive OR circuit 14–1 to 14–4 is connected to the respective storage flip-flop of shift register 12 which is representative of non-zero term in generator polynomial G(X), i.e., flip-flops 12–1, 12–9, 12–13, 12–15 and 12–17 correspond to $g_0$, $g_4$, $g_6$, $g_7$, and $g_8$, respectively.

The Bose-Chaudhuri code polynomials $$C_1(X)=G(X)\times I_1(X)=c_{1-14} \dots c_{1-1}c_{1-0}$$
$$C_2(X)=G(X)\times I_2(X)=c_{2-14} \dots c_{2-1}c_{2-0}$$

and $$C_3(X)=G(X)\times I_3(X)=c_{3-14} \dots c_{3-1}c_{3-0}$$

are provided by encoder 10 on terminal 16.

The following specific example will illustrate the operation of encoder 10 in modulo 2 algebra.

If $I_1(X)=i_{1-6} \dots i_{1-1}i_{1-0}=1100101$, the product $$\begin{aligned}G(X)\times I_1(X)=C_1(X)&=c_{1-14} \dots c_{1-1}c_{1-0}\\&=(X^8+X^7+X^6+X^4+X^0)+(X^6+X^5+X^3+X^2+X^0)\\&=X^{14}+X^{10}+X^6+X^5+X^4+X^3+X^2+X^0\\&=100011001111101\end{aligned}$$

Consider the result of the introduction of $I_1(X)$ to flip-flop 12–1. Since the operation is in modulo 2 algebra, the output of an exclusive OR circuit, e.g., exclusive OR circuit 14–1, is either a 0 or a 1, dependent on the inputs thereto. If the inputs are 1 and 1, the output is 0; and if 0 and 1 or 1 and 0, the output is 1. At $A_1$ shift pulse time, $i_{1-0}=1$ sets flip-flop 12–1 to the 1 state. As the flip-flops of shift register 12 were set to 0 before the introduction of $I_1(X)$, flip-flops 12–9, 12–13, 12–15 and 12–17 are in the 0 state. As the total number of inputs to the exclusive OR circuits in exclusive OR path 14 contains an odd number of 1's, the first bit of the Bose-Chaudhuri code $C_1(X)$ is $c_{1-0}=1$ at terminal 16. At $B_1$ shift pulse time a 1 is set in flip-flop 12–2 while the 1 remains in flip-flop 12–1. Therefore, the number of 1's introduced to the exclusive OR circuit path 14 is odd, and the second bit of C(X), $c_{1-1}=1$, is applied to terminal 16. The following table illustrates the state pairs of $SC_2$ shift pulses and the respective receive pulse $R_1$, $R_2$ and $R_3$ must be appropriately timed to effect the de-interlacing. This timing is coordinated between pulse sources 25 and 27 via cable $C_2$. Furthermore, they must be appropriately phased relative to the pairs of shift pulses $SC_1$ and the transmit pulses $T_1$, $T_2$ and $T_3$ to account for the time transmission of the code bits of the $(B-C)(X)$ between terminals 26 and 28 of noisy channel 24. In this manner, the original 15 bit Bose-Chaudhuri codes $C_1(X)$, $C_2(X)$ and $C_3(X)$ which were in the respective shift registers 20–1, 20–2 and 20–3 are reconstructed with $t$ error-bursts of maximum burst length $b$ distributed as $t$ errors in the $b$ reconstructed codes. Illustratively, an error burst of burst length 3, i.e., 3 binary bits in length between first and last bits of the burst, is distributed into the shift registers 34–1, 34–2 and 34–3 as a single error in each of the reconstructed codes R(X). Had these codes been transmitted without the interlacing, the number of errors in each of the reconstructed codes could have been up to 3 bits which would have been beyond the capability of the respective Bose-Chaudhuri code C(X) to correct. The embodiment hereof is designed to correct up to $t=2$ errors in each R(X). A 45 bit counter 32 is connected to terminal 28 and provides a signal when the last bit $C_{3-14}$ of $(B-C)(X)$ arrives thereat.

The counter 32 counts the code bits which arrive on terminal 28. It indicates by count 45 that the reconstructed Bose-Chaudhuri codes R(X) have been established in shift registers 34–1, 34–2 and 34–3, respectively. When the count 45 is obtained in counter 32, a pulse is sent therefrom via OR circuit 31 to ring-switch 36 to cause it to move from home position H to the first switch position SW–1. Ring-switch 36 is a conventional electronic stepping switch with four active terminals H, SW–1, SW–2 and SW–3. The ring-switch 36 in position SW–1 enables gate circuit 33–1 to establish the contents of shift register 34–1 in storage register 42. Ring-switch 36 when set in position SW–2 and SW–3 causes $R_2(X)$ and $R_3(X)$ in shift registers 34–2 and 34–3, respectively, to be gated via gate circuits 33–2 and 33–3, respectively, to storage register 42. Subsequent circuitry, to be described with reference to FIG. 1*b*, causes ring-switch 36 via a pulse on line 37 (FIG. 1*b*) and OR circuit 31 to move to the next position SW–2 when $R_1(X)$ has been decoded. When the R(X)'s have all been decoded, a pulse on line 37 from AND circuit 70–1 (FIG 1*b*) resets ring-switch 36 to the home H position. Ring-switch 36 then provides a signal on line 39 to reset counter 32. It also provides a signal to request-order unit 40 which in turn advises transmit-order unit 43 that transmit pulses $T_1$, $T_2$ and $T_3$ may be applied to AND circuits 22–1, 22–2 and 22–3, respectively, as described above to transmit the next group of R(X)'s in shift registers 34–1, 34–2 and 34–3, respectively, on noisy channel 24. During the time interval that the R(X)'s are being decoded by the circuitry of FIG. 1*b*, information stream 15 has been sampled for the next group of I(X)'s and the next group of C(X)'s has been established in shift registers 20 as described hereinbefore for $C_1(X)$, $C_2(X)$ and $C_3(X)$.

FIG. 1*b*

The nature and operation of the section of the embodiment for correcting error-positions in a reconstructed code R(X) stored in storage register 42 and thereafter decoding it to the corresonding information sequence I(X) will now be described with reference to FIG. 1*b*.

Illustratively, consider the presence of $R_1(X)$ in storage register 42. Gate pulse 47 enables gate circuit 46–1 to present $R_1(X)$ on cable 49 to matrix multiply unit 48. Matrix multiply unit 48 establishes the product $$R_1(X)\times M$$

where M is the matrix of parity check rules for $M=4$ and $t=2$, i.e., Expression (3) above. Matrix multiply unit 48 will be described in greater detail later with reference to FIG. 2. It provides representative binary bit sequences for $S_1$ and $S_3$, the odd power-sum symmetric functions, i.e., $S_1=s_{1-1}s_{1-2}s_{1-3}s_{1-4}$, and
$S_3=s_{3-1}s_{3-2}s_{3-3}s_{3-4}$.

Figure 3:
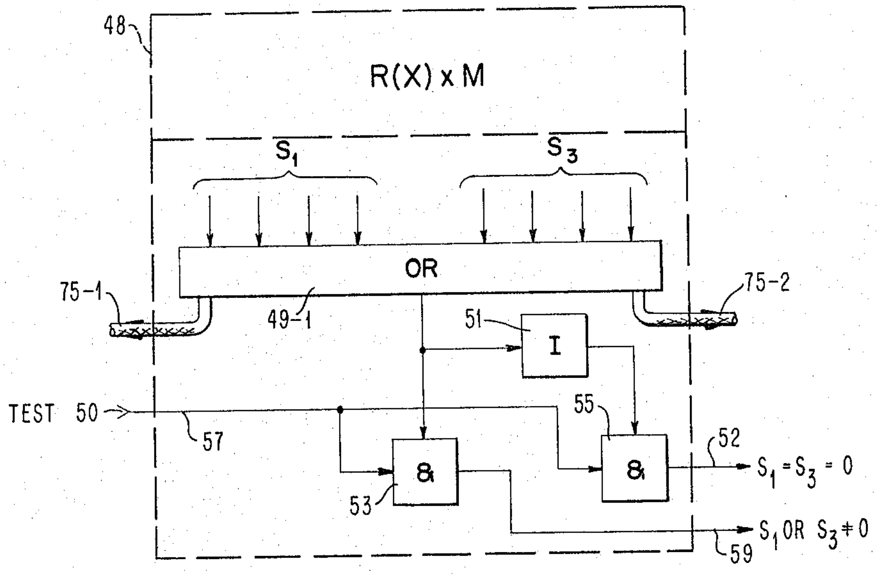
FIGURE 3 is a block diagram of a circuit for determining if either $S_1$ or $S_3$ in the product from the matrix multiply unit of FIGURE 2 is equal to zero.

A test pulse 50 is used to determine if $S_1$ and $S_3=0$ or if $S_1$ or $S_3\neq 0$. FIG. 3, which illustrates circuitry for making this determination, will be described later. If $S_1$ and $S_3=0$, a signal is passed from matrix multiply 48 on line 52 via OR circuit 54 to gate 46–2 which passes $R_1(X)$ in storage register 42 to the decoder 56 via cable 60. Decoder 56 will be described hereinafter in greater detail with reference to FIG. 9. The decoder 56 provides the quotient $R(X)/G(X)$ of the division of dividend $R_1(X)$ by the divisor G(X), the generator polynomial, in quotient register 62. The divisor G(X) is permanently established in divider 58. The quotient in quotient register circuit 62 is applied to gate 64. A remainder detector 66 is connected to divider 58, to ascertain if the remainder from $R(X)/G(X)=0$ or $\neq 0$. Remainder detector 66 has a structure similar to the structure of FIG. 3 used for testing if $S_1$ or $S_3\neq 0$. In the event that the remainder equals 0, the test pulse 68 enables AND circuit 70–1 which enables gate 64 to provide the information sequence $L_1(X)$ on cable 72. The output of AND unit 70–1 is also transmitted as a signal on line 37 to ring-switch 36 (FIG. 1*a*) via OR circuit 31 to cause it to step to the SW–2 position. As a consequence of the setting of ring-switch 36 to the SW–2 position, the contents $R_2(X)$ of shift register 34–2 is passed to storage register 42 via gate circuit 33–2.

If the remainder from remainder detector $66\neq 0$, the test pulse 68 enables AND circuit 70–2 and an indication is provided on lin 74 of an uncorrectable error in the R(X) in storage register 42. Divider unit 58 of decoder 56 will be described hereinafter in greater detail with reference to FIG. 9.

If $S_1$ or $S_3\neq 0$, $S_1$ is passed by gate 76–1 to square unit 78 and also to divide unit 80. Square unit 78 will be dscribed in greater detail hereinafter with reference to FIG. 5, and divide unit 80 will be described in greater detail hereinafter with reference to FIG. 4*b*.

In accordance with the terminology of coding theory described hereinbefore, the relationships between the elementary symmetric functions $\sigma_i$ and the power-sum symmetric functions $S_i$ are as follows:

$\sigma_1=S_1$,
$\sigma_2=S_3/S_1+S_1^2$

Square unit 78 provides the representative binary bit sequence of $S^2_1$ to add unit 82 (to be described in greater detail hereinafter with reference to FIG. 7). Divide unit 80 provides the representative binary bit sequence of $S_3/S_1$ to add unit 82. Add unit 82 provides $$\sigma_2=S_3/S_1+S_1^2$$

Test pulse 85 enables gate circuit 84 to pass $\sigma_2$ on cable 99 to each correction control unit 86–1, 86–2, . . . 86–15 of correction control 86. The correction control 86 will be described in greater detail hereinafter with reference to FIG. 8.

The correction control 86 solves the equation $$X^2+\sigma_1X+\sigma_2=0$$

for its roots $\gamma$ and $\delta$. The signals from correction control 86 corresponding to the roots (FIG. 8) are used to designate the positions of the reconstructed Bose-Chaudhuri code which are in error and correct them. Each section of the correction control 86 is associated with a particular term of the characteristic matrix of the matrix multiplier 48. A table of the $X_i(i=1$ to $15)$ for the respective terms of the Bose-Chaudhuri code $C_1(X)$ to be corrected is presented below as Table II. As noted above, the $X_i$ are the respective binary bit sequences from the first column of $M_{(t=2)}$.

TABLE II

| Bose-Chaudhuri Code | $X_i$ | Correction Control Uhit |
|---|---|---|
| $c_{1-0}$ | 0001 | 86-0 |
| $c_{1-1}$ | 0010 | 86-1 |
| $c_{1-2}$ | 0100 | 86-2 |
| $c_{1-3}$ | 1000 | 86-3 |
| $c_{1-4}$ | 0011 | 66-4 |
| $c_{1-5}$ | 0110 | 86-5 |
| $c_{1-6}$ | 1100 | 86-6 |
| $c_{1-7}$ | 1011 | 86-7 |
| $c_{1-8}$ | 0101 | 86-8 |
| $c_{1-9}$ | 1010 | 86-9 |
| $c_{1-10}$ | 0111 | 86-10 |
| $c_{1-11}$ | 1110 | 86-11 |
| $c_{1-12}$ | 1111 | 86-12 |
| $c_{1-13}$ | 1101 | 86-13 |
| $c_{1-11}$ | 1001 | 86-14 |

Correction control circuit 86 consists of 15 units designated 86–0 through 86–4. A signal from a correction control unit on cable 92 causes a reversal of the respective bit in the storage register 42, thereby correcting an error made during the transmission of the interlaced Bose-Chaudhuri code $(B—C)(X)$ on channel 24. A test pulse applied on line 88 via line 23 determines which of the correction control units indicates an error. The test signal on line 88 is also passed via delay unit 90 and OR circuit 54 to gate circuit 46–2. Delay line 89 accounts for the time it takes to operate the correction control 86. The gate circuit 46–2 transmits the information in storage register 42 to the decoder 56 where it is processed identically as for the circumstance where $S_1$ and $S_3=0$ as described above.

FIG. 2

The details of matrix multiply unit 48 will now be described with reference to FIG. 2. Reading down and across, respectively, from the upper left-hand corner of FIG. 2, there are fifteen horizontal lines, HL–1, HL–2 . . . HL–15 and eight vertical lines VL–1, VL–2 . . . VL–8. Each bit of a reconstructed Bose-Chaudhuri code polynomial, e.g., $$R_1(X)=r_{1-14}r_{1-13} \ldots r_{1-0}$$

from storage register 42 (FIG. 1*b*) is applied to a respective horizontal line. At each intersection point that it is desired to multiply a particular bit of $R_1(X)$ by the respective component bit of the matrix $M_{t=2}$ of Expression (3) above, an exclusive OR circuit is connected in the respective vertical line where the component bit is 1, except where a vertical line first connects to a horizontal line. Since the product of a $R_1(X)$ binary bit by 0 is still 0, an exclusive OR circuit is not required in FIG. 2 where the component bit of $M_{t=2}$ is 0.

The operation of matrix multiply unit 48 in obtaining the odd power-sum symmetric functions $S_1$ and $S_3$ will be described now with a specific example. The bits of $$R_1(X)=r_{1-14}r_{1-13} \ldots r_{1-0}$$

are established in a column with the lowest-order bit $r_{1-0}$ in the first row, i.e., the respective bits of $R_1(X)$ are established in the respective rows of the matrix $M_{(t=2)}$. Each bit of $R_1(X)$ is multiplied times each bit in the respective row of $M_{(t=2)}$, i.e., the products $$R_1(X) \times M_1,\ R_1 \times M_2 \ldots R_1 \times M_8$$

are formed, where $M_1, M_2, \ldots M_8$ are the columns of $M_{(t=2)}$. The sum of the bits of each product in modulo 2 algebra gives the components of $S_1$ and $S_3$. Since $$S_1=s_{1-4}, s_{1-3}, s_{1-2}, s_{1-1} \text{ and}$$
$$S_3=(s_{3-4}, s_{3-3}, s_{3-2}, s_{3-1})$$

the components are formed as follows:

$$s_{1-4}=(r_{1-0} \times M_{1-1})+(r_{1-1} \times M_{1-2})+ \ldots (r_{1-14} \times M_{1-15})$$
$$s_{1-3}=(r_{1-0} \times M_{2-1})+(r_{1-1} \times M_{2-2})+ \ldots (r_{1-14} \times M_{2-15})$$
$$\ldots$$
$$s_{3-1}=(r_{1-0} \times M_{8-1})+(r_{1-1} \times M_{8-2})+ \ldots (r_{1-14} \times M_{8-15})$$

where $$M_{1-1}, M_{1-2}, \ldots M_{1-15};$$
$$M_{2-1}, M_{2-2}, \ldots M_{2-15};$$
$$\ldots$$
$$M_{8-1}, M_{8-2}, \ldots M_{8-15};$$

are the bits of $$M_1, M_2, \ldots M_8$$

in each respective row of $M_{(t=2)}$. The following Table III illustrates the performance of matrix multiply unit 48 for the specific example of $$R(X)=100011001111101$$

where $$R_1(X)=C_1(X)$$

since $$S_1 \text{ and } S_3=0$$

TABLE III

| R(X) | M | $R_1(X) \times M_1$ | $M_2$ | $R_1(X) \times M_2$ | $M_3$ | $R_1(X) \times M_3$ | $M_4$ | $R_1(X) \times M_4$ | $M_5$ | $R_1(X) \times M_5$ | $M_6$ | $R_1(X) \times M_6$ | $M_7$ | $R_1(X) \times M_7$ | $M_8$ | $R_1(X) \times M_8$ |
|---|---|---|---|---|---|---|---|---|---|---|---|---|---|---|---|---|
| $r_{1-0}=1$ | 0 | 0 | 0 | 0 | 0 | 0 | 1 | 1 | 0 | 0 | 0 | 0 | 1 | 0 | 1 | 1 |
| $r_{1-1}=0$ | 0 | 0 | 0 | 0 | 1 | 0 | 0 | 0 | 1 | 0 | 0 | 0 | 0 | 0 | 0 | 0 |
| $r_{1-2}=1$ | 0 | 0 | 1 | 1 | 0 | 0 | 0 | 0 | 1 | 1 | 1 | 1 | 0 | 0 | 0 | 0 |
| $r_{1-3}=1$ | 1 | 1 | 0 | 0 | 0 | 0 | 0 | 0 | 1 | 1 | 0 | 0 | 1 | 1 | 0 | 0 |
| $r_{1-4}=1$ | 0 | 0 | 0 | 0 | 1 | 1 | 1 | 1 | 1 | 1 | 1 | 1 | 1 | 1 | 1 | 1 |
| $r_{1-5}=1$ | 0 | 0 | 1 | 1 | 1 | 1 | 0 | 0 | 0 | 0 | 0 | 0 | 0 | 0 | 1 | 1 |
| $r_{1-6}=1$ | 1 | 1 | 1 | 1 | 0 | 0 | 0 | 0 | 1 | 1 | 0 | 0 | 0 | 0 | 0 | 0 |
| $r_{1-7}=0$ | 1 | 0 | 0 | 0 | 1 | 0 | 1 | 0 | 1 | 0 | 1 | 0 | 0 | 0 | 0 | 0 |
| $r_{1-8}=0$ | 0 | 0 | 1 | 0 | 0 | 0 | 1 | 0 | 1 | 0 | 0 | 0 | 1 | 0 | 0 | 0 |
| $r_{1-9}=1$ | 1 | 1 | 0 | 0 | 1 | 1 | 0 | 0 | 1 | 1 | 1 | 1 | 1 | 1 | 1 | 1 |
| $r_{1-10}=1$ | 0 | 0 | 1 | 1 | 1 | 1 | 1 | 1 | 0 | 0 | 0 | 0 | 0 | 0 | 1 | 1 |
| $r_{1-11}=0$ | 1 | 0 | 1 | 0 | 1 | 0 | 0 | 0 | 1 | 0 | 0 | 0 | 0 | 0 | 0 | 0 |
| $r_{1-12}=0$ | 1 | 0 | 1 | 0 | 1 | 0 | 1 | 0 | 1 | 0 | 1 | 0 | 0 | 0 | 0 | 0 |
| $r_{1-13}=0$ | 1 | 0 | 1 | 0 | 0 | 0 | 1 | 0 | 1 | 0 | 0 | 0 | 1 | 0 | 0 | 0 |
| $r_{1-14}=1$ | 1 | 1 | 0 | 0 | 0 | 0 | 1 | 1 | 1 | 1 | 1 | 1 | 1 | 1 | 1 | 1 |
| | | s=0 1-4 | | s=0 1-3 | | s=0 1-2 | | s=0 1-1 | | s=0 3-4 | | s=0 3-3 | | s=0 3-2 | | s=0 3-1 |

FIG. 3

Figure 2:
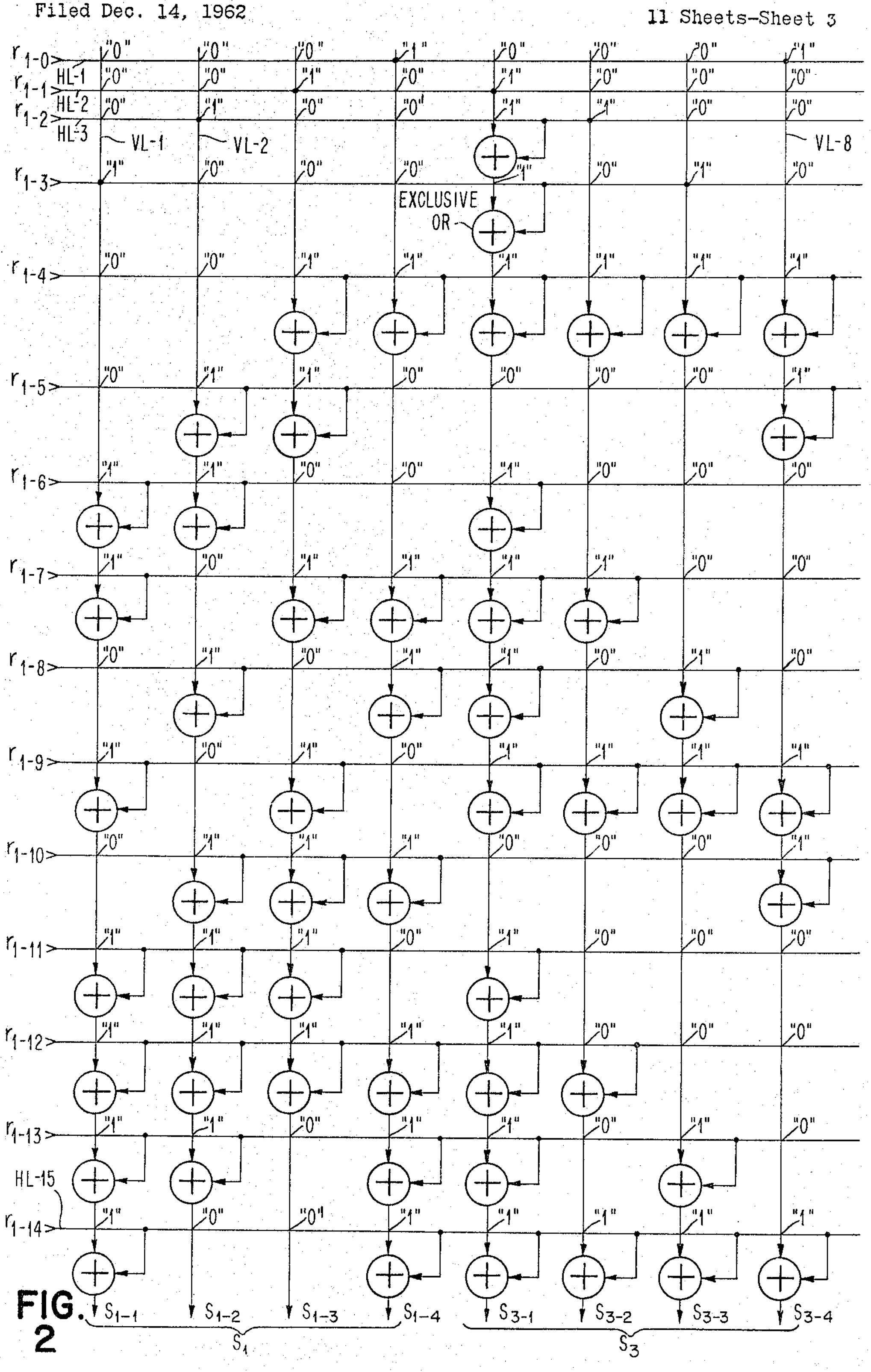
FIGURE 2 is a block diagram of the matrix multiply unit utilized for obtaining the product from the multiplication of a characteristic matrix by a code vector.

The manner in which matrix multiply unit 48, shown in block form in FIG. 1*b* and in detail in FIG. 2, is tested by test pulse 50 to determine if $S_1$ and $S_3=0$ or if $S_1$ or $S_3 \neq 0$, will be described with reference to FIG. 3. The binary bit sequences of both $S_1$ and $S_3$ are introduced to OR circuit 49. The binary bits of $S_1$ exit from OR circuit 49–1 on cable 75–1; and the binary bits of $S_3$ exit from OR circuit 49–1 on cable 75–2. The output from OR circuit 49 is introduced to inverter 51 and AND circuit 53. Test pulse 50 enables AND circuits 53 and 55. The output of inverter 51 is introduced to AND circuit 55. An indicator pulse is obtained on line 52 if $S_1$ and $S_3=0$ because the down level from OR circuit 49 is inverted in inverter 51 to an up level at AND circuit 55. If $S_1$ or $S_3 \neq 0$, AND circuit 53 provides an indicator pulse on line 57.

FIG. 4*a*

The following discussion of theory of finite fields with reference to FIG. 4*a* presents background for understanding the theoretical basis for the divide unit of FIG. 4*b* and the multiply unit of FIG. 5.

The non-zero elements of any finite field form a multiplicative cyclic group. A multiplicative operation in a finite field may be either a multiply operation or a divide operation. There exists primitive roots $g$ such that all elements of the multiplicative group can be expressed as distinct powers of $g$. Illustratively, consider the finite field $GF(2^2)$ which has the elements $$1, \alpha, 1+\alpha$$

subject to the rule that $$\alpha^2+\alpha+1=0$$

$\alpha$ is a primitive root since $\alpha^1=\alpha$,
$\alpha^2=1+\alpha$, and
$\alpha^3=\alpha(1+\alpha)=\alpha+\alpha^2=1$.

The structure of a multiplicative group makes it possible to do multiplication and division over the finite fields $GF(p^n)$ by counting the exponents. Illustratively, consider the linear sequential circuit 61 with feedback of FIG. 4*a*. Chapter 7 of the noted book by W. W. Peterson on error-correcting codes presents a background discussion of linear sequential circuits. Circuit 61 comprises shift registers 61–1 and 61–2 connected by exclusive OR circuit 61–3. The output of register 61–2 is connected to both exclusive OR circuits 61–3 and shift register 61–1. Information transfer occurs from register 61–1 to register 61–2 via exclusive OR circuit 61–2; and from register 61–2 to exclusive OR circuit 61–3 and to register 61–1. If the unit polynomial is stored as the initial condition of shift register 61–1, and any non-zero element X of $GF(2^2)$ is stored as an initial condition in register 61–2, the contents of register 61–2 will be successively all the states that correspond to all the non-zero elements of the field. For example, if $X=01$ is stored initially in register 61–2, the sequence is 01, 10, 11, 01, 10, . . .

The divide unit of FIG. 4*b* and the multiply unit of FIG. 5 are designed using the theoretical principle of the operation of linear sequential circuit 61. In each unit there are two synchronized linear sequential circuits with feedback for the practice of this invention. In FIG. 5 there is also a storage register.

Each binary bit sequence is entered in a register of FIGS. 4*b* and 5 with the low-order bit thereof in the right flip-flop unit and the high-order bit thereof in the left flip-flop unit.

FIG. 4*b*

FIG. 4*b* is a block diagram of a divide unit 80 in accordance with the invention for performing division in modulo 2 algebra of a representative binary bit sequence of a dividend $S_3$ by a representative binary bit sequence of a divisor $S_1$. The divisor $S_1$ is established in shift register 112 via cable 77 and the dividend $S_3$ is established in shift register 114 via cable 79. The binary bit sequences for $S_1$ and $S_3$ are established in shift registers 112 and 114, respectively, with the low-order bits in the flip-flops 116 and 126, respectively and the high-order bits in flip-flops 122 and 132, respectively. Shift registers 112 and 114 are shifted synchronously under the timing control of shift pulses $p_{1-2}$ and $p_{1-3}$ until the unit polynomial 0001 appears in shift register 112. The appearance of 0001 in shift register 112 is ascertained by shift pulse $p_{1-1}$ on line 141. A signal from AND circuit 142 on line 143 causes pulse generator 144 to stop pulsing. The quotient $S_3/S_1$ is obtained simultaneously as the binary bit sequence in shift register 114.

The flip-flops shown for shift registers 112 and 114 are merely illustrative of the functions thereof. The physical character of each shift register will be understood through the description hereinafter of FIG. 6 which shows shift register 114 in considerable detail.

Shift register 112 has flip-flops 116, 118, 120 and 122 connected so that information is transferred via the path from flip-flop 116 to flip-flop 120. An exclusive OR circuit 124 is connected between flip-flops 116 and 118. Information is also transferred in feedback from flip-flop 122 to exclusive OR circuit 124 and to flip-flop 116. Shift register 114 has flip-flops 126, 128, 130 and 132. Information is transferred via the path from flip-flop 126 to flip-flop 132. Exclusive OR circuit 134 is connected between flip-flops 126 and 128. Information is also transferred in feedback from flip-flop 132 to exclusive OR circuit 134 and to flip-flop 126.

AND circuits 136, 138, 140 and 142 are connected in a serial path, and are connected to the 0 positions of flip-flops 122, 122, 118 and to the 1 position of flip-flop 116, respectively. AND circuit 142 is connected to a three phase clock pulse generator 144 which provides clock pulses $p_{1-1}$, $p_{1-2}$ and $p_{1-3}$. Pulse $p_{1-1}$ enables AND circuit 136 and pulses $p_{1-2}$ and $p_{1-3}$ cause shift registers 112 and 114 to shift synchronously. Divide circuit 80 provides the binary bit sequence for quotient $S_3/S_1$ on cables 145 to 148, i.e., cable 81 of FIG. 1*b*, which are connected to flip-flops 126, 128, 130 and 132, respectively. The quotient $S_3/S_1$ has the following binary bit sequence $$S_3/S_1=(S_3/S_1)_4(S_3/S_1)_3(S_3/S_1)_2(S_3/S_1)_1$$

FIG. 5

FIG. 5 is a block diagram of a multiply unit 100 (FIG. 8) in accordance with this invention. Since square units 78 (FIG. 1*b*) and 98 (FIG. 8) and multiply unit 100 (FIG. 8) are similar, only multiply unit 100 will be described herein in detail. Shift registers 146 and 148 and storage register 150 are incorporated in multiply unit 100. Shift registers 146 and 148 are similar in construction to the shift register presented in FIG. 6, to be described hereinafter. Initially, a multiplier sequence $\sigma_1$ is established in the storage register 150 via cable 96, a multiplicand sequence $X_1$ is established in shift register 148 via cable 94–2, and a unit polynomial 0001 is established in the shift register 146 from unit polynomial register 147 by test pulse 50. The low-order bit of the respective binary bit sequence is established in the right flip-flop of the respective register. The high order bit of the respective binary bit sequence is established in the left flip-flop of the respective register. The shift registers are shifted synchronously by shift pulse $p_{2-2}$ and $p_{2-3}$ until shift register 148 displays the multiplier sequence. The product $\sigma_1 X_1$ is simultaneously obtained as the binary bit sequence in shift register 146.

The flip-flops in shift registers 146 and 148 merely represent the function thereof. The physical structure required therefor will be understood with reference to FIG. 6 which illustrates a similar shift register in considerable detail.

Shift register 146 includes flip-flops 152, 154, 156 and 158. Shift register 148 includes flip-flops 160, 162, 164 and 166. Each pair of corresponding 1 and 0 positions of the respective flip-flops of storage register 150 and shift register 146 are connected to AND circuits 178 to 185, respectively. The outputs of AND circuit pairs 178 and 179, 180 and 181, 182 and 183, and 184 and 185 are connected to the respective OR circuit 186 to 189. The OR circuits 186 to 189 are connected, respectively, to AND circuits 190 to 193. Three phase clock pulse generator 194 provides clock pulses $p_{2-1}$, $p_{2-2}$ and $p_{2-3}$. Clock pulses $p_{2-1}$ enable AND circuit 190 and clock pulses $p_{2-2}$ and $p_{2-3}$ are cause shift registers 146 and 148 to shift synchronously. Ultimately, a clock pulse $p_{2-1}$ causes AND circuit 190 to enable AND circuits 191, 192 and 193. When the binary bit sequence of $\sigma_1$ appears in shift register 146, clock pulse generator 194 is stopped.

Simultaneously, $\sigma_1 X$ appears in shift register 148, and an indication thereof is obtained on output cables 163–1 to 163–4.

The structure presented in FIG. 5 is readily adaptable for effecting a polynomial combination of three polynomials in modulo 2 algebra over a finite field, e.g., $P_1(X)$, $P_2(X)$ and $P_3(X)$. Initially, $P_1(X)$ and $P_2(X)$ are established in shift registers 146 and 148, respectively, and $P_3(X)$ is established in storage register 150. Shift registers 146 and 148 are shifted synchronously until $P_3(X)$ appears in shift register 146. Simultaneously, the multiplicative polynomial combination $$(P_1(X) \times P_3(X))/P_2(X)$$

appears as the output of shift register 148. When $$P_1(X)=U(X)$$

the unit polynomial, the multiplicative combination at the output of shift register 148 is the division operation $P_1(X)/P_2(X)$.

FIG. 6

FIG. 6 presents shift register 114 of divide unit 80 (FIG. 4*b*) in considerable detail.

The physical structures of shift registers 112 and 114 of FIG. 4*b* and shift registers 148 and 146 of FIG. 5 will be apparent from the description of FIG. 6. The binary bit sequence representative of $S_3$ is introduced to shift register 114 on lines 79–1 to 79–8 of cable 79. Lines 79–1 and 79–2 set the 0 and 1 states, respectively, of storage flip-flop 117–1 of flip-flop unit 126. Lines 79–3 and 79–4 set the 0 and 1 states, respectively, of flip-flop 117–2 of flip-flop 128. Lines 79–5 set the 0 and 1 states, respectively, of flip-flop 117–3 of flip-flop unit 130. Lines 79–7 and 79–8 set the 0 and 1 states, respectively, of flip-flop 117–4 of flip-flop unit 132. The low order bit of the binary bit sequence $S_3$ is established in flip-flop 117–1. The high-order bit of $S_3$ is established in flip-flop 117–4.

The binary bits of the outputs $S_3/S_1$ are provided on cable 81 from shift register 114. Lines 81–1 and 81–2 read the 0 and 1 states, respectively, of flip-flop 117–1. Lines 81–3 and 81–4 read the 0 and 1 states, respectively, of flip-flop 117–2. Lines 81–5 and 81–6 read the 0 and 1 states, respectively of flip-flop 117–3. Lines 81–7 and 81–8 read the 0 and 1 states, respectively, of flip-flop 117–4. AND circuits 119–1 and 119–2 are connected, respectively, between the 0 and 1 states of flip-flop 115–1 and lines 79–1 and 79–2. AND circuits 119–3 and 119–4 are connected between the 0 and 1 states of flip-flop 115–2 and lines 79–3 and 79–4, respectively. AND circuits 119–5 and 119–6 are connected between the 0 and 1 states of flip-flop 115–3 and lines 79–5 and 79–6, respectively. AND circuits 119–7 and 119–8 are connected between the 0 and 1 states of flip-flop 115–4 and lines 79–8 and 79–9, respectively. Shift pulses $p_{1-3}$ from pulse generator 144 (FIG. 4*b*) enable AND circuits 119–1 to 119–8. AND circuit 121–2 is connected betwen the 1 state of flip-flop 117–1 and exclusive OR circuit **123*a* of exclusive OR unit 134**.

The outputs of exclusive OR circuits **123*a* and 123*b* of exclusive OR unit 134 are connected, respectively, to the 1 and 0 states of flip-flop 115–2. AND circuits 121–3 and 121–4 are connected between the 0 and 1 state of flip-flop 117–2 and the 0 and 1 states of flip-flop 115–3, respectively. AND circuits 121–5 and 121–6 are connected between the 0 and 1 states of flip-flops 117–3, and 115–4**, respectively.

AND circuits 121–7 and 121–8 are connected between the 0 and 1 states of flip-flop 117–4 and 115–1. AND circuit 121–8 is also connected to exclusive OR circuit **123*a*. Shift pulses $p_{1-2}$ from pulse generator 144** (FIG. 4*b*) are connected to exclusive OR circuit **123*b* and to AND circuits 121–2 to 121–8. After the representative binary bit sequence of $S_3$ is set in flip-flops 117–1 to 117–4, shift pulses $p_{1-2}$ cause directional transfer of information therein toward flip-flops 115–2, 115–3, 115–4, and 115–1, respectively. Shift pulses $p_{1-3}$ cause directional transfer of information stored in flip-flops 115–1 to 115–4 toward flip-flops 117–1 to 117–4**.

The transfer of information to and from exclusive OR unit 134 will now be described. If the two inputs to exclusive OR circuit **123*a* or 123*b* are 0, and 0 or 1 and 1, the output therefrom is a 0. If the two inputs are 0 and 1, the output is 1. Illustratively, assume flip-flop 117–1 is set to the 1 state, and flip-flop 117–4 is set to the 1 state. Accordingly, exclusive OR circuit 123*a* introduces a 0 to exclusive OR circuit 123*b*, which together with a $p_{1-2}$ shift pulse sets flip-flop 115–2** to the 0 state.

FIG. 7

Since add unit 82 (FIG. 1*b*) and add units 102 and 104 (FIG. 8) are of similar construction, only add unit 82 will be described herein. With reference to FIG. 7, add unit 82 provides $\sigma_2$, the sum of $S_1^2$ and $S_3/S_1$ in modulo 2 algebra. The component binary bits $(S_1^2)_1$ $(S_1^2)_2$ $(S_1^2)_3$ and $(S_1^2)_4$ of $S_1^2$ are introduced on lines 200 to 203, respectively. The component binary bits $(S_3/S_1)_1$ $(S_3/S_1)_2$, $(S_3/S_1)_3$ and $(S_3/S_1)_4$ of $S_3/S_1$, are introduced on lines 204 to 207, respectively. Lines 200 and 204 are connected to exclusive circuit OR circuit 208. Lines 201 are connected to exclusive OR circuit 209. Lines 202 are connected to exclusive OR circuit 210. Lines 203 and 207 are connected to exclusive OR circuit 211. Exclusive OR circuits 208 to 211 provide on their output lines 212 to 215, repectively, the components of $$\sigma_2=S_1^2+S_3/S_1$$

i.e., $$\sigma_{2-1}=(S_1^2)_1+(S_3/S_1)_1,$$
$$\sigma_{2-2}=(S_1^2)_2+(S_3/S_1)_2,$$
$$\sigma_{2-3}=(S_1^2)_3+(S_3/S_1)_3, \text{ and}$$
$$\sigma_{2-4}=(S_1^2)_4+(S_3/S_1)_4.$$

FIG. 8

Since correction control units 86–1, 86–2 . . . 86–15 of correction unit 86 have identical structure, only one unit is presented in FIG. 8. It includes a storage register 95 containing the respective $X_i$. Square unit 98 and multiply unit 100 have been described in greater detail hereinabove with reference to FIG. 5. The term $X^2$ from square unit 98 and the term $\sigma_1 X$ from multiply circuit 100 are applied to add unit 102. Add unit 102 and 104 are similar in construction and were described hereinabove with reference to FIG. 7. The term $(X^2+\sigma_1 X)$ from add unit 102 and the term $\sigma_2=S_3/S_1+S_1^2$ on cable 99 are added in add unit 104 which provides the representative binary bit sequence of $X^2+\sigma_1 X+\sigma_2$ to zero detect unit 106. A test pulse 88 enables AND circuit 110 to provide correction signal on cable 92 if the output of zero detect unit is a 0. The $R_1(X)$ in storage register 42 has sustained an error in the respective position if and only if the output of add unit 104 is 0.

After the reconstructed code polynomial $R_1(X)$ in storage register 42 has been corrected by correction control 86, it is applied via gate circuit 46–2 to divider unit 58 (FIG. 1*b*) of decoder 56 as the dividend. The divisor $G(X)$ is permanently established in decoder 56. Decoder 56 provides the quotient and remainder from the division operation $R_1(X)/G(X)$. If all the errors in $R_1(X)$ have been corrected, the remainder $=0$ and the quotient in quotient register 62 is the original information bit sequence $I_1(X)$. However, if a remainder other than 0 is indicated by remainder detector 66, an uncorrectable error is present in $R(X)$. The structure of the circuitry of FIG. 3 is readily adapted to provide remainder detector 66. A test pulse 68 interrogates remainder detector 66 via the respective AND circuit 70–1 and 70–2 and applies a signal on either line 74 or on line 37, respectively. A signal on cable 74 indicates an uncorrectable error has occurred in the $R_1(X)$. A signal on line 37 enables gate circuit 64 to pass the quotient in quotient register 62 to the output cable 72, and it also causes ringswitch 36 (FIG. 1*a*) to advance one position.

FIG. 9

The decoder 56 (FIG. 1*b*) will be described in considerable detail with reference to FIG. 9, which is a functional block diagram thereof, and FIGS. 10*a* and 10*b* which present a block diagram of an illustrative portion 220 of FIG. 9 in still greater detail.

The decoder 56 decodes an R(X) in storage register 42 (FIG. 1*b*) applied thereto by gate circuit 46–1 or via gate circuit 46–2. It is applied as stored in storage register 42 from shift registers 34 if $S_1$ and $S_3=0$; or it is applied as corrected by correction control 86 if $S_1$ or $S_3\neq 0$. The representative binary bit sequence of $R_1(X)$ either in the original form or in the corrected form is applied to divider 58 and stored therein in storage register 222. The example portrayed in FIG. 9 utilizes $$R_1(X)=C_1(X)=100011001111101$$

The binary bit representation of the generator polynomial $$G(X)=111010001$$

is permanently stored in register 224.

The respective positions of storage register 224 are directly under the corresponding high order positions of storage register 222. The corresponding positions of the generator polynomial G(X) in register 224 and the respective high order positions of $R_1(X)$ in storage register 222 are added in modulo 2 algebra and the result thereof is established in register 226. In the event that the high order position in register 226 is 0, the high order position of the quotient is established as a 1 in flip-flop 227 of quotient register 62. In the event that the high order position is a 1, flip-flop 227 is set to 0. When the high order position in register 226 is 1, AND circuit 228 is enabled and the $r_{1-13}$ to $r_{1-6}$ positions of storage register 222 are established in register 232 via OR circuit 252; and $r_{1-5}$ in register 222 is entered directly as the low order position in register 232. When the high order position in register 226 is a 0, AND circuit 230 is enabled and the contents of register 226, except for the high order position are established in register 232; and $r_{1-5}$ in register 222 is entered directly as the low order position in register 232. In FIG. 9, the sequence in register 232 is shown shifted one position to the right relative to sequence in register 224 in order to assist in understanding the mathematical performance. The representative binary bit sequence is established permanently in storage register 234 whose positions are shown directly under the respective positions in register 232. The sequence in register 232 is added in modulo 2 algebra to the sequence in register 234 according to respective positions. The sum is established in register 236.

If the high order position in register 236 is 1, the next bit of the quotient is established in flip-flop 238 of quotient register 62 as 0. In this circumstance, the sequence in register 232 without the high order position is established in register 244 via AND circuit 242 and OR circuit 254, and the $r_{1-4}$ position in register 222 is entered directly in register 244 as the low order position. If the high order position in register 236 is a 0, flip-flop 238 is set to 1 and the sequence in register 232 minus the high order position is passed to register 244; and the $r_{1-4}$ position in register 222 is entered directly in register 244 as the low order position. The decoding process proceeds in the manner described down through the decoder 56 until the quotient is established in quotient register 62 and the remainder is established in register 246. The remainder in register 246 is passed to remainder detector 66 via cable 248. The operation from remainder detector 66 has been described above with reference to FIG. 1*b*.

Divider 58 obtains the quotient and remainder for the division operation of dividend $R_1(X)$ by divisor G(X) through the use of a technique of successive subtractions. The first step is to subtract G(X) from the higher-order corresponding sequence of $R_1(X)$, i.e.,

```
1 0 0 0 1 1 0 0 1 1 1 1 1 0 1=dividend
1 1 1 0 1 0 0 0 1           =divisor
---------------------------------------
0 1 1 0 0 1 0 0 0           =1st difference
```

In modulo 2 algebra addition and subtraction are performed identically. If the high-order position of the first difference is a 0, the quotient has a corresponding 1 in its high order position, and vice-versa.

Since the high-order position of the 1st difference is a 0, the remaining sequence thereof becomes the high-order positions of the 1st new dividend. Its low-order position is the next lower unused position of the original dividend.

```
1 1 0 0 1 0 0 0 1=1st new dividend
1 1 1 0 1 0 0 0 1=divisor
-----------------
0 0 1 0 0 0 0 0 0=2nd difference
```

Had the high-order position of the 1st difference been a 1, the 1st new dividend would have been the high-order sequence of $R_1(X)$ minus its high-order bit. Again, the high-order position of the 2nd difference is 0. Hence, the next lower position of the quotient is a 1. This technique is applied step by step until the low-order position of $R_1(X)$ has been utilized therein. The entire operation is presented in FIG. 9 for the illustrative $R_1(X)$ and G(X).

FIGS. 10*a* AND 10*b*

With reference to FIGS. 10*a* and 10*b* the structure of portion 220 of FIG. 9 will be described in greater detail. Register 222 comprise flip-flops 222–1 to 222–15, in which the bits of the $R_1(X)$ are established, respectively. Register 224 has an exclusive OR circuit in each position where G(X) has a 1. Exclusive OR circuits 224–1, 224–5, 224–7, 224–8 and 224–9 are connected, respectively, to the 1 positions of flip-flops 222–7, 222–11, 222–13, 222–14 and 222–15. Each position 224–2, 224–3, 224–4 and 224–6 in register 224 where G(X) has a 0 is connected directly to the 1 position of the respective flip-flops. The exclusive OR circuit 224–9 of register 224 is connected to the 0 position of flip-flop 227 of quotient register 62 and to AND circuits 228; and is connected via inverter circuit 0 to the 1 position of flip-flops 227 and to AND circuits 230.

Flip-flops 222–7 to 222–14 of register 224 are connected to AND circuits 228–1 to 228–8, respectively, of AND unit 228. Positions 224–1 to 224–8 of register 224 are connected to AND circuits 230–8 to 230–1, respectively. AND circuits 228–8 to 222–1 and AND circuits 230–1 to 230–8 are connected, respectively, to OR circuits 252–1 to 252–8, respectively. The outputs of OR circuits 252–1 to 252–8 are connected to positions 234–2 to 234–9 of register 234 (FIG. 10*b*). Exclusive OR circuit 234–1 is connected to the 1 position of flip-flop 222–6. The other connections of FIG. 10*b* are analogous to the comparable connections of FIG. 10*a*.

FIG. 11

Circuit 298 of FIG. 11 provides test pulses 85 for causing the transmission of $\sigma_2$ from add unit 82 to correction control 86 and test pulse 88 for causing the error positions in $R_1(X)$ in storage register 42 to be corrected via cable 92 from correction control 86. The fall of pulse 88 on line 299 from single-shot 316 resets all the flip-flops of circuit 298 to 0.

The $p_{2-1}$ pulse which stops pulse generator 194 (FIG. 5) sets flip-flop 300 to its 1 position; the $p_{1-1}$ pulse which stops pulse generator 144 (FIG. 4*b*) sets flip-flop 302 to its 1 position. The outputs of the 1 positions of flip-flops 300 and 302 enable AND circuit 304 which sets flip-flop 306 to its 1 position. Flip-flop 306 provides test pulse 85 as its output. Test pulse 85 causes gate circuit 84 to pass $\sigma_2$ from add unit 82 to correction control 86 (FIG. 1*b*).

The two outputs from flip-flop unit 308–1 are applied to AND unit 314. The $p_{2-1}$ pulse which stops the pulse generator (similar to pulse generator 194 of FIG. 5) for each square unit 99 (FIG. 8) sets flip-flop 310 to its 1 position and provides one output from flip-flop unit 308–1. The pulse $p_{2-1}$ which stops the pulse generator (similar to pulse generator 194 of FIG. 5) for each multiply unit 100 sets flip-flop 312 to its 1 position and provides the other output from flip-flop unit 308–1. There is a flip-flop unit 308 for each correction control unit 86–0 to 86–14, i.e., flip-flop units 308–1 to 380–15. The output of AND unit 314 causes single-shot 316 to provide test pulse 88.

FIG. 12

The timing of the embodiment will now be described with reference to the timing chart of FIG. 12. Certain groups of sequential operations within the embodiment depend upon operational conditions. Therefore, the timing chart is separated into successive time domains TD–1, TD–2 and TD–3, illustrated by line graph 400. Time domain TD–1 operates in $t_1$ time; time domain TD–2 operates in $t_2$ time; and time domain TD–3 operates in $t_3$ time. The signals and pulses within a particular time domain have specific sequential relationships with each other. However, the time intervals shown in the timing chart are merely illustrative.

Time domain TD–1 encompasses the time interval 402 covering the encoding of *b* information I(X)'s into code bits and the establishing of the corresponding *b* C(X)'s in shift registers 20 (FIG. 1*a*). Time domain TD–1 includes shift pulses A and B; entry control pulses $E_1$, $E_2$ and $E_3$ and shift control pulses $SC_{1-1}$, $SC_{1-2}$ and $SC_{1-3}$. Subsequent to $C_3(X)$ being established in shift register 20–3, reset pulse 39 resets counter 32 (FIG. 1*a*).

Time domain TD–2 covers the time interval during which the C(X)'s in shift registers 20 are transferred to shift registers 34. A request order pulse 41 from request order unit 40 to transmit order unit to initiate the interlacing of the C(X)'s and the transmission of the (B—C) (X) on transmission line 24. In time domain $TD_2$, a C(X) bit is transferred from a shift register 20 to the corresponding shift register 34 by a pair of pulses, $T_1$ and $R_1$, $T_2$ and $R_2$, $R_3$ and $T_3$, respectively. Because of the time interval required for the transmission of the (B—C) (X) between terminals 26 and 28, $R_1$, $R_2$ and $R_3$ have a phase with $T_1$, $T_2$ and $T_3$, respectively. The last flip-flop of a shift register 20 is a storage flip-flop and the first flip-flop of shift register 34 is a transfer flip-flop. Hence, subsequent to a $T_1$ pulse, a pair of shift pulses $SC_1$ makes available the precedent bit of $C_1(X)$ to the last storage register of shift register 20–1, and subsequent to an $R_1$ pulse, a pair of shift pulses $SC_2$ transfers the corresponding $R_1(X)$ bit in a transfer flip-flop of shift register 34–1 to the next storage flip-flop therein. Similarly, a pair of shift pulses $SC_1$ follows each $T_2$ and $T_3$; and a pair of shift pulses $SC_2$ follows each $R_2$ and $R_3$.

The operation of the embodiment in time domain TD–3 will be described with reference to error correcting and decoding of $R_1(X)$. In time domain $TD_3$, after the decoding of $R_3(X)$, pulse 37 from AND circuit 70–1 (FIG. 1*b*) causes ring-switch 36 to move from the SW–3 position to the home position H. A pulse 35 from counter 32 causes the ring-switch 36 to move from the home position H to the first switch position SW–1. Switch position SW–1 provides a step voltage which cause the transfer of $R_1(X)$ in shift register 34–1 via gate 33–1 into storage register 42. Test pulse 47 causes $R_1(X)$ in storage register 42 to be applied to matrix multiply unit 48 via gate circuit 46–1. Thereafter, a test pulse 50 determines (FIG. 3) if $S_1$ and $S_3=0$; or if $S_1$ or $S_3\neq0$. If $S_1$ and $S_3=0$, a test pulse 68 causes the R(X) in storage register 42 to read into divider 58 of decoder 56 via gate circuit 46–2. However, if $S_1$ or $S_3\neq0$, $S_1$ is read into square unit 78, divide unit 80 (FIG. 1*b*) and square units 99 and multiply units 100 of correction control 86 (FIG. 8) whose respective shift registers are started shifting synchronously by start pulse 73 from delay unit 71 applied to the respective pulse generators 144 and 194. Delay unit 71 accounts for the time required to make the other requisite entries in the registers of units 78, 80, 99 and 100. Test pulse 50 also sets the unit polynomial in unit polynomial unit 167 (FIG. 5) into shift register 146. Units 78, 80, 99 and 100 require different time intervals for their operations, dependent on the particular polynomials being combined thereby. The circuitry of FIG. 11 which provides test pulses 85 and 88 takes account of the variable time intervals. Test pulse 85 (FIG. 11) reads $\sigma_2$ from add unit 82 (FIG. 1*b*) into correction control 86 (FIGS. 1*b* and 8). Test pulse 88 causes correction control 86 (FIGS. 1*b* and 8) to correct the error positions in the R(X) in storage register 42 via cable 92. Test pulse 93 enables gate circuit 46–2 (FIG. 1*b*) to apply $R_1(X)$ in storage register 42 to divider unit 58 via cable 60. After decoder 56 has operated to establish the quotient and remainder of $R(X)/G(X)$ in quotient register 62 and remainder detector 66, respectively, test pulse 68 (FIG. 1*b*) enables AND circuits 70–1 and 70–2. An uncorrectable error in the $R_1(X)$ in storage register 42 is indicated by a signal on line 74 from AND circuit 70–2 if the remainder $\neq0$. If the remainder $=0$, the quotient is presented to output cable 72.

*Conclusion*

The practice of this invention has been illustrated herein with a description of the nature and operation of an embodiment thereof. The circuitry of the embodiment was developed for an input information stream which contained three respective representative information polynominals, i.e., $$I_1(X)=i_{1-6}X^6+i_{1-5}X^5+\ .\ .\ .\ i_{1-0}X^0,$$
$$I_2(X)=i_{2-6}X^6+i_{2-5}X^5+\ .\ .\ .\ i_{2-0}X^0,\text{ and}$$
$$I_3(X)=i_{3-6}X^6+i_{3-5}X^5+\ .\ .\ .\ i_{3-0}X^0,$$

where $i_1=i_{1-0}$ or $i_1=i_{1-1}$ etc., is either a binary 1 or binary 0. By multiplying each information polynomial by a generator polynomial $$G(X)=g_8X^8+g_7X^7+\ .\ .\ .\ g_0X$$

a respective code polynomial was obtained, i.e., $$C_1(X)=G(X)\times I_1(X)=c_{1-14}\ .\ .\ .\ c_{1-1}c_{1-0},$$
$$G_2(X)=G(X)\times I_2(X)=c_{2-14}\ .\ .\ .\ c_{2-1}c_{2-0},\text{ and}$$
$$C_3(X)=G(X)\times I_3(X)=c_{3-14}\ .\ .\ .\ c_{3-1}c_{3-0}.$$

The binary 1 and binary 0 coefficients are the elements of a finite field. In general, the practice of this invention is not restricted to use of a finite field having 2 elements. The coefficients may be selected from any particular finite field. When the coefficients are so selected, the modifications to the embodiment and the features thereof will be apparent to one skilled in the art in view of the following discussion.

This invention can be practiced with an information stream in which the coefficients of the information polynomials are elements in a finite field GF($q$) having $q$ components, i.e., $i_1=f_0f_1\ .\ .\ .\ f_{q-1}$, where $q$ is a power of a prime number p, i.e., $p=p^m$ where $m$ is a positive integer.

In the general case, where the number of elements in a finite field is more than 2, the apparatus for carrying out error correction and multiplicative combination of polynomials for the practice of this invention can be accomplished in a similar but more complicated manner, according to the structure of the finite field we are dealing with. The more general structure can be illustrated by considering two different extensions of the case of the field of 2 elements. The extensions will be understood through reference to the following diagram:

$$\begin{array}{ccc} GF(2) & \rightarrow & GF(2^m) \\ \downarrow & \searrow & \downarrow \\ GF(p) & \rightarrow & GF(p^m)=GF(q) \end{array}$$

The first extension described below involves the transition from modulo 2 to modulo $p$. The second extension described below involves the transition from modulo $p$ to modulo $p^m$. Alternatively, transitions, not described herein, may be considered from modulo 2 to modulo $2^m$ and from modulo $2^m$ to modulo $p^m$.

First, consider the finite field which has $p$ elements, where $p$ is a prime number. In this case, the exclusive OR units which perform the modulo 2 addition will be replaced by a more general addition unit which performs addition modulo $p$. Furthermore, there will be a set of multiplier units for multiplication modulo $p$. Each storage unit, i.e., analogous to a flip-flop unit utilized herein, will have $p$ states. The manner in which the more general addition units, the multiplier units and the storage units are combined for the practice of this invention with a finite field of more than 2 elements is analogous to the binary case and is discussed in detail in Chapter 7 of the noted book on error-correcting codes by Peterson. Specifically, reference should be made to FIGS. 7.3 and 7.6.

The construction of the unit for performing a multiplicative combination of polynomials $P_1$, $P_2$ and $P_3$ over $GF(p)$ can be accomplished in an analogous manner to the binary case. The feedback shift registers will be combined and operate much in the same way as in the binary case. An extension of the embodiment disclosed herein in this direction is straightforward for those who are skilled in art.

Second, another direction of extension is to consider the finite fields which consist of $q$ elements where $q$ is a power of 2. In this case, each element of the finite field can be represented by a polynomial. These elements with polynomial representation can be operated on according to the rules of the finite field $GF(2^m)$. As in the case of $GF(p)$, the extensions of the method of decoding and methods of multiplication and division of polynomials whose coefficients are elements of $GF(2^m)$ can be implemented in the manner described in chapter 7 of the noted book by Peterson. The method discussed in Peterson is in the general language of finite fields without any restriction as to which finite field is involved and will apply equally well to any finite field. Furthermore, the extensions of finite fields into a more complicated mathematical structure that obeys the rules of a field, is again a finite field. It is therefore within the skill of the art, considering the disclosure herein, to devise techniques of decoding and multiplicative polynomial combinations applicable for all finite fields. Although the resultant structures may be complicated, the principles upon which they are constructed are as described herein.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for correcting errors in code in which first, second and third polynomials are utilized incident to said error correcting comprising, in combination:
- means to establish a selected order of transmission on a channel of the elements of said code, and
- means to correct said errors sustained by said code during said transmission including
- shift register means in which said first and second polynomials are initially established for effecting a multiplicative polynomial combination of said first, second and third polynomials over a finite field and
- means for shifting said shift register means synchronously until said third polynomial appears therein to obtain simultaneously therewith said multiplicative polynomial combination therein.

2. Apparatus for correcting errors in code in which first, second and third polynomials are utilized incident to said error correcting comprising, in combination:
- means to establish a selected order of transmission on a channel of the elements of said code, and
- means to correct said errors sustained by said code during said transmission including
- shift register means in which said first and second polynomials are initially established for effecting a multiplicative polynomial combination of said first, second and third polynomials over a finite field having
- means for synchronously developing the representative sequences of finite field elements of said first and second polynomials in said shift register means to obtain therein the representative sequence of elements from said field of said multiplicative combination when the representative sequence of elements from said field of said third polynomial appears therein.

3. Apparatus for correcting errors in binary code comprising, in combination:
- means to establish said code from an information stream of binary bits by multiplying selected information sequences therefrom, respectively, by the representative binary bit sequence of a generator polynomial,
- means to establish a selected order of transmission on a channel of the binary bits of said code, and
- means to correct said errors sustained by said code during said transmission including
- means for effecting a multiplicative polynomial combination of first, second and third polynomials in modulo 2 algebra over a finite field having
- first and second shift registers in which said first and second polynomials are initially established, respectively, and
- means for shifting said shift registers synchronously until said third polynomial appears in said second shift register to obtain simultaneously therewith said multiplicative polynomial combination in said first shift register.

4. Apparatus for correcting errors sustained by a code comprising, in combination:
- means to establish said code from an information stream by multiplying selected information sequences of elements in said information stream by a respective Bose-Chaudhuri generator polynomial to obtain $b$ Bose-Chaudhuri codes,
- means to interlace said Bose-Chaudhuri codes for transmission on a channel as an interlaced Bose-Chaudhuri code,
- means to reconstruct said Bose-Chaudhuri codes after said transmission of said interlaced code to establish said errors in said reconstructed codes, and
- means to decode said Bose-Chaudhuri reconstructed codes including
- means for effecting a multiplicative polynomial combination of first, second and third polynomials over a finite field.

5. Apparatus for correcting errors sustained by a binary code, comprising, in combination:
- means to establish said transmission code from an information stream of binary bits by multiplying selected information sequences of binary bits in said information stream by a respective Bose-Chaudhuri generator polynomial to obtain $b$ identical length Bose-Chaudhuri codes,
- means to interlace said Bose-Chaudhuri codes sequentially bit by bit for transmission on a channel as an interlaced Bose-Chaudhuri code,
- means to reconstruct said Bose-Chaudhuri codes after said transmission of said interlaced code to establish said errors in said reconstructed codes, and means to decode said Bose-Chaudhuri reconstructed codes including means for effecting a multiplicative polynomial combination of first, second and third polynomials in modulo 2 algebra over a finite field, said latter means having first and second shift registers in which said first and second polynomials are initially established, respectively, and means for shifting said shift registers synchronously until said third polynomial appears in said second shift register to obtain simultaneously therewith said multiplicative polynomial combination in said first shift register.

6. Apparatus for correcting $t$ error-bursts of maximum burst length $b$ sustained by a code generated from an information stream of elements comprising, in combination:

means to multiply $b$ information sequences of elements in said information stream respectively by a generator polynomial to obtain $b$ codes, means to interlace said codes sequentially element by element for transmission on a channel as an interlaced code, means to reconstruct said codes after said transmission of said interlaced code, thereby to establish said error-bursts as independent errors in said reconstructed codes, and means to decode said reconstructed codes including means to correct said independent errors in each said code including means for effecting a multiplicative polynomial combination of first, second and third polynomials over a finite field.

7. Apparatus for correcting $t$ error-bursts of maximum burst length $b$ sustained by a binary code generated from an information stream of binary bits comprising, in combination:

means to multiply $b$ identical length information sequences of binary bits in said information stream respectively by a generator polynomial to obtain $b$ identical length codes, means to interlace said codes sequentially bit by bit for transmission on a channel as an interlaced code, means to reconstruct said codes after said transmission of said interlaced code to establish said error-bursts as independent errors in said reconstructed codes, and means to decode said reconstructed codes including means to correct said independent errors in each said code including means for effecting a multiplicative polynomial combination of first, second and third polynomials in modulo 2 algebra over a finite field having first and second shift registers in which said first and second polynomials are initially established, respectively, and means for shifting said shift registers synchronously until said third ploynomial appears in said second shift register to obtain simultaneously therewith said multiplicative polynomial combination in said first shift register.

8. Apparatus for correcting $t$ error-bursts of maximum burst length $b$ sustained by a code generated from an information stream of elements comprising, in combination:

means to multiply $b$ information sequences of elements in said information stream, respectively, by a Bose-Chaudhuri generator polynomial to obtain $b$ Bose-Chaudhuri codes, means to interlace said Bose-Chaudhuri codes sequentially element by element for transmission on a channel as an interlaced Bose-Chaudhuri code, means to reconstruct said Bose-Chaudhuri codes after said transmission of said interlaced code, thereby to establish said error-bursts as independent errors in said reconstructed codes, and means to decode said Bose-Chaudhuri reconstructed codes including means to correct said independent errors in each said code including means for effecting a multiplicative polynomial combination of first, second and third polynomials over a finite field.

9. Apparatus for correcting $t$ error-bursts of maximum burst length $b$ sustained by a binary code generated from an information stream of binary bits comprising, in combination:

means to multiply $b$ identical length information sequences of binary bits in said information stream respectively by a Bose-Chaudhuri generator polynomial to obtain $b$ identical length Bose-Chaudhuri codes, means to interlace said Bose-Chaudhuri codes sequentially bit by bit for transmission on a channel as an interlaced Bose-Chaudhuri code, means to reconstruct said Bose-Chaudhuri codes after said transmission of said interlaced code to establish said error-bursts as independent errors in said reconstructed codes, and means to decode said Bose-Chaudhuri reconstructed codes including means to correct said independent errors in each said code including means for effecting a multiplicative polynomial combination of first, second and third polynomials in modulo 2 algebra over a finite field having first and second shift registers in which said first and second polynomials are initially established, respectively, and means for shifting said shift registers synchronously until said third polynomial appears in said second shift register to obtain simultaneously therewith said multiplicative polynomial combination in said first shift register.

10. Apparatus for correcting errors sustained by a code during transmission thereof on a channel in which first, second and third polynomials are utilized incident to said error correcting characterized by:

means for effecting a multiplicative polynomial combination of first, second and third polynomials over a finite field having first and second shift registers in which said first and second polynomials are initially established, respectively, and means for shifting said shift registers synchronously until said third polynomial appears in said second shift register to obtain simultaneously therewith said multiplicative polynomial in said first shift register.

11. Apparatus for correcting errors sustained by a code during transmission thereof on a channel in which first, second and third polynomials are utilized incident to said error correcting characterized by:

means for effecting a multiplicative polynomial combination of first, second and third polynomials over a finite field, said polynomials having dependence on a Bose-Chaudhuri code, having first and second shift registers in which said first and second polynomials are initially established, respectively, and means for shifting said shift registers synchronously until said third polynomial appears in said second shift register, whereby said multiplicative polynomial combination appears simultaneously in said first shift register.

12. Apparatus for correcting errors sustained by a code during transmission thereof on a channel in which first, second and third polynomials are utilized incident to said error correcting characterized by:

means for effecting a multiplicative polynomial combination of said first, second and third polynomials in modulo 2 algebra over a finite field, said polynomials having dependence on a Bose-Chaudhuri code, having first and second shift registers in which said first and second polynomials are initially established, respectively, and means for shifting said shift registers synchronously until said third polynomial appears in said second shift register to obtain simultaneously therewith said multiplicative polynomial combination in said first shift register.

13. In apparatus for correcting errors sustained by a code during transmission on a channel in which a dividend polynomial and a divisor polynomial are utilized incident to said error correcting:

a divide unit for obtaining the quotient from the division of said dividend polynomial by said divisor polynomal over a finite field having first and second shift registers in which are established, respectively, representative sequences of elements from said field of said divisor and said dividend, said divide unit including means for synchronously shifting said registers after said polynomials are established therein and means for obtaining said quotient as the sequence of elements from said field in said second shift register when the unit polynomial appears in said first shift register.

14. In apparatus for correcting errors sustained by a binary code during transmission on a channel in which first and second polynomials are utilized incident to said error correcting:

a divide unit for obtaining the quotient from the division of a dividend polynomial by a divisor polynomial in modulo 2 algebra over a finite field having first and second shift registers in which originally are established, respectively, representative binary bit sequences of said divisor and said dividend, said divide unit including means for synchronously shifting said registers after said polynomials are established therein and means for obtaining said quotient as the binary bit sequence in said second shift register when the unit polynomial appears in said first shift register.

15. In apparatus for correcting errors sustained by a code during transmission on a channel in which a multiplicand polynomial, a multiplier polynomial and a unit polynomial are utilized incident to said error correcting:

a multiply unit for obtaining the product from the multiplication of said first and second polynomials over a finite field, said multiply unit having first and second shift registers and a storage register in which are established sequences of elements from said field, respectively, representative of said unit polynomial, said multiplicand polynomial and said multiplier polynomial, means for shifting said shift registers synchronously after said polynomials are established therein and means for obtaining said product as the sequence of elements from said field in said second shift register when said first shift register manifests said multiplier sequence.

16. In apparatus for correcting errors sustained by a binary code during transmission on a channel in which first and second polynomials are utilized incident to said error correcting:

a multiply unit for obtaining the product from the multiplication of first and second polynomials in modulo 2 algebra over a finite field, said multiply unit having first and second shift registers and a storage register in which are established, respectively, a unit polynomial, a multiplicand binary bit sequence representative of said first polynomial and a multiplier binary bit sequence representative of said second polynomial, means for shifting said shift registers synchronously after said polynomials are established therein and means for obtaining said product as the binary bit sequence in said second shift register when said first shift register manifests said multiplier sequence.

17. Apparatus for effecting a multiplicative polynomial combination of first, second and third polynomials over a finite field comprising:

first and second shift registers in which representative sequences of elements from said field of said first and second polynomials are established, respectively, and means for shifting said shift registers synchronously after said polynomials are established therein until the representative sequence of elements from said field of third polynomial appears in said second shift register to obtain simultaneously therewith the representative sequence of elements from said field of said multiplicative polynomial combination in said first shift register.

18. Apparatus for effecting a multiplicative polynomial combination of first, second and third polynomials in modulo 2 algebra over a finite field comprising:

first and second shift registers in which the representative binary bit sequence of said first and second polynomials are established, respectively, and means for shifting said shift registers synchronously after said polynomials are established therein until the representative binary bit sequence of said third polynomial appears in said second shift register to obtain simultaneously therewith the representative binary bit sequence of said multiplicative polynomial combination in said first shift register.

19. Apparatus for providing the quotient from the division of a dividend polynomial by a divisor polynomial over a finite field including:

first and second shift registers in which are established representative sequences of elements in said field of said divisor polynomial and said dividend polynomial, respectively.

means for synchronously shifting said shift registers after said polynomials are established therein, and means for obtaining said quotient as the sequence of elements from said field in said second shift register when the representative sequence of elements from said field of the unit polynomial appears in said first shift register.

20. Apparatus for providing the quotient from the division of a dividend polynomial by a divisor polynomial in modulo 2 algebra over a finite field including:

first and second shift registers in which are originally established representative binary bit sequences of said divisor polynomial and said dividend polynomial, respectively, means for synchronously shifting said shift registers after said polynomials are established therein, and means for obtaining said quotient as the binary bit sequence in said second shift register when the unit polynomial appears in said first shift register.

21. Apparatus for providing the product from the multiplication of a multiplicand polynomial by a multiplier polynomial over a finite field including:

first and second shift registers and a storage register in which are originally established, respectively, representative sequences of elements from said field of the unit polynomial, said mulitplier polynomial and said multiplicand polynomial, means for synchronously shifting said shift registers, and means for comparing the contents of said first shift register with the contents of said storage register to obtain said product as the sequence of elements from said field in said second shift register when said first shift register manifests said multiplier sequence.

22. Apparatus for providing the product from the multiplication of a multiplicand polynomial by a multiplier polynomial in modulo 2 algebra over a finite field including:

first and second shift registers and a storage register in which are originally established, respectively, representative binary bit sequences of the unit polynomial, said multiplier polynomial and said multiplicand polynomial, means for synchronously shifting said shift registers, and means for comparing the contents of said first shift register with the contents of said storage register to obtain said product as the binary bit sequence in said second shift register when said first shift register manifests said multiplier sequence.

23. Apparatus for correcting $t$ error-bursts of maximum burst length $b$ in an interlaced code, established from an input information stream of elements including:

means to multiply each inforation polynomial of $b$ selected information polynomials of said information stream by a generator polynomial to establish $b$ codes, shift register means for storing each said established code.

interlacing means for establishing said interlaced code, and means to reconstruct said original codes with up to $t$ error-bursts of maximum burst length $b$ sustained by said interlaced code during transmission on a channel as up to $t$ errors in each said reconstructed code.

24. Apparatus for correcting $t$ error-bursts of maximum burst length $b$ in an interlaced binary code, established from an input information stream of binary bits including:

means to multiply each information polynomial of $b$ selected information polynomials of said information stream by a generator polynomial, thereby to establish $b$ identical length codes, shift register means for storing each said established code, interlacing means for establishing said interlaced code by transmitting said codes sequentially bit by bit, and means to reconstruct said original codes with up to $t$ error-bursts of maximum burst length $b$ sustained by said interlaced code during transmission on a channel as up to $t$ errors in each said reconstructed code.

25. Apparatus for correcting $t$ error-bursts of maximum burst length $b$ in an interlaced Bose-Chaudhuri code, established from an input information stream of elements including:

means to multiply each information polynomial of $b$ selected information polynomials of said information stream by a Bose-Chaudhuri generator polynomial to establish $b$ Bose-Chaudhuri codes, shift register means for storing each said established Bose-Chaudhuri code, interlacing means for establishing said interlaced Bose-Chaudhuri code, and means to reconstruct said original Bose-Chaudhuri codes with up to $t$ error-bursts of maximum burst length $b$ sustained by said interlaced Bose-Chaudhuri code during transmission on a channel as up to $t$ errors in each said reconstructed code.

26. Apparatus for correcting $t$ error-bursts of maximum burst length $b$ in an interlaced Bose-Chaudhuri binary code, established from an input information stream of binary bits including:

means to multiply each information polynomial of $b$ selected information polynomials of said information stream by a Bose-Chaudhuri generator polynomial to establish $b$ identical length Bose-Chaudhuri codes, shift register means for storing each said established Bose-Chaudhuri code, interlacing means for establishing said interlaced Bose-Chaudhuri code by transmitting said codes sequentially bit by bit, and means to reconstruct said original Bose-Chaudhuri codes with up to $t$ error-bursts of maximum burst length $b$ sustained by said interlaced Bose-Chaudhuri code during transmission on a channel as up to $t$ errors in each said reconstructed code.

27. Apparatus for correcting $t$ error-bursts of maximum burst length $b$ in a binary bit field of length $b(2^m-1)=n$ comprising, in combination:

encoder means to encode $b$ identical length $k$ information binary bit sequences to $b$ respective identical length $(n-k)$ Bose-Chaudhuri codes, where $$n-k=mt$$

check bits, said encoder means including an encoder receptive of each said information sequence to form therefrom each said respective Bose-Chaudhuri code by multiplying therewith a generator polynomial G(X) to establish $b$ said Bose-Chaudhuri codes, said polynomial G(X) being determined by said $k$ and said $t$, said shift register means including $b$ shift registers in which said Bose-Chaudhuri codes are established, respectively, said shift register means including respective entry control timing means and first AND circuits, means to interlace said Bose-Chaudhuri codes to form therefrom an interlaced Bose-Chaudhuri code by transmitting said codes sequentially bit by bit on a channel, means to deinterlace said interlaced code after transmission on said channel to establish $b$ reconstructed Bose-Chaudhuri codes, said deinterlacing means having $b$ shift registers therein in which said original codes are reconstructed with up to $t$ correctable errors in each said reconstructed code, said deinterlacing means also including receive control timing means and respective second AND circuits, means for operating on each said code for correcting said correctable errors, and means for decoding each said code including means for indicating whether all errors are corrected.

28. Apparatus of claim 27 in which said error correction means includes for the numerical value of the parameters $k=7$, $m=4$, $t=2$ and $n=15$:

matrix multiply means to establish $M \times R(X)$ to provide the power-sum symmetric functions $S_1$ and $S_3$, where $M$=a characteristic matrix determined by said parameters, and $R(X)$=a polynomial representative of said reconstructed Bose-Chaudhuri code after transmission on said channel;

means to provide the representative binary bit sequence respectively, for the elementary symmetric functions $$\sigma_1=S_1$$
$$\sigma_2=S_3/S_1+S^2{}_1$$

correction control means receptive of said $\sigma_1$ and said $\sigma_2$ for solving the equation $X^2+\sigma_1 X+\sigma_2$ for its roots $\gamma$ and $\delta$ to provide related respective signals indicative of error and non-error positions in said transmitted code to correct said error positions; and decoder means for reestablishing the representative binary bit sequence of each said information polynomial.

29. In apparatus for correcting errors in a Bose-Chaudhuri code by solving the equation $X^t+\sigma_1 X^{t-1}+\sigma_2 X^{t-2}+ \ldots \sigma_t=0$, where $t$ is a positive integer, $X^t, X^{t-1}, \ldots X$ are powers of elements of a finite field and $\sigma_1 \ldots \sigma_t$ are elementary symmetric functions:

correction control means including means adapted to receive the representative finite field elements, respectively, of said $\sigma_1$, $\sigma_2$ . . . $\sigma_t$ and said X, and means to provide a multiplicative polynomial combination of first, second and third polynomials over a finite field, said latter means having first and second shift registers in which the representative sequence of elements from said field of said first and second polynomials are initially established, and means for shifting said shift registers synchronously until the representative sequence of elements from said field of said third polynomial appears in said second shift register to obtain simultaneously therewith said multiplicative combination as the representative sequence of elements from said field in said first shift register.

30. Apparatus for solving the equation $X^t+\sigma_1X^{t-1}+\sigma_2X^{t-2}+ . . . \sigma_t=0$, where $t$ is a positive integer, $X^t$, $X^{t-1}$, . . . X are powers of elements of a finite field, and $\sigma_1$ . . . $\sigma_t$ are elementary symmetric functions characterized by:

means adapted to receive elements in a finite field representative of said $\sigma$'s and a selected X, and means to provide a multiplicative polynomial combination of first, second and third polynomials over a finite field, said latter means having first and second shift registers in which the representative sequence of elements in said field of said first and second polynomials are initially established, and means for shifting said shift registers synchronously until the representative sequence of elements in said field of said third polynomial appears in said second shift register to obtain simultaneously therewith said multiplicative combination as the representative sequence of elements from said field in said first shift register.

31. Apparatus for solving the equation $X^2+\sigma_1X+\sigma_2=0$, where $\sigma_1$ and $\sigma_2$ are elementary symmetric functions and $X^2$ and X are powers of elements of a finite field characterized by:

a storage register adopted to store the binary bit sequence representative of a selected $X_i$;

square circuit means adapted to provide the binary bit sequence of $X^2_i$ having first and second shift registers in which said $X_i$ and the unit polynomial are established, and a first storage register in which said $X_i$ is established, and means for shifting said shift registers synchronously until said $X^2_i$ is obtained in said second shift register;

multiply means adapted to provide the representative binary bit sequence of $\sigma_1X_i$ having third and fourth shift registers in which are established said $X_i$ and the unit polynomial, and a second storage register in which is established said $\sigma_1$ and means for shifting synchronously said shift registers until the representative binary bit sequence for said $\sigma_1X_i$ is obtained in said fourth shift register;

first add circuit means to provide the representative binary bit sequences for $X^2_i+\sigma_1X_i$ from said square circuit means and said multiply circuit means, respectively;

second add circuit means adapted to receive the representative binary bit sequence for said $\sigma_2$ and provide the representative binary bit sequence of the sum thereof with said binary bit sequence of said $X^2_i+\sigma_1X_i$, said sum being the representative binary bits sequence for $$X^2_i+\sigma_1X_i+\sigma_2$$

References Cited by the Examiner

UNITED STATES PATENTS

| | | | |
|---|---|---|---|
| 2,956,124 | 10/1960 | Hagelbarger | 340—146.1 |
| 3,050,251 | 8/1962 | Steele | 235—164 |
| 3,155,818 | 11/1964 | Goetz | 340—146.1 |
| 3,159,739 | 12/1964 | Deerfield | 235—164 |
| 3,182,180 | 5/1965 | Keir | 235—164 |

MALCOLM A. MORRISON, *Primary Examiner.*

ROBERT C. BAILEY, *Examiner.*

M. P. ALLEN, *Assistant Examiner.*